United States Patent [19]
Dougherty et al.

[11] Patent Number: 5,162,164
[45] Date of Patent: Nov. 10, 1992

[54] DUAL BATTERY SYSTEM

[75] Inventors: Thomas J. Dougherty, Waukesha; Alan J. Klebenow, Brookfield; Edward N. Mrotek, Grafton; David A. Thuerk, Brookfield; Maurice C. Michaud, Mequon, all of Wis.

[73] Assignee: Globe-Union Inc., Milwaukee, Wis.

[21] Appl. No.: 614,033

[22] Filed: Nov. 15, 1990

Related U.S. Application Data

[63] Continuation of Ser. No. 472,908, Jan. 31, 1990, abandoned, which is a continuation-in-part of Ser. No. 365,084, Jun. 12, 1989, abandoned.

[51] Int. Cl.$^5$ ............................................. H01M 2/30
[52] U.S. Cl. ........................................ 429/9; 429/150; 429/160; 429/179
[58] Field of Search ................... 429/9, 149, 150, 160, 429/179, 178, 123; 320/6, 14, 15, 49; 307/10.6

[56] References Cited

U.S. PATENT DOCUMENTS

| | | | |
|---|---|---|---|
| 2,044,917 | 6/1936 | Richardson | 320/6 X |
| 3,165,689 | 1/1965 | Hughes | |
| 3,200,014 | 8/1965 | Roberts | 429/9 |
| 3,475,221 | 10/1969 | Jordan et al. | |
| 3,758,345 | 9/1973 | Toth | 429/9 X |
| 3,901,731 | 8/1975 | Warszawski et al. | 429/9 |
| 4,239,839 | 12/1980 | McDowall et al. | 429/154 |
| 4,444,853 | 4/1984 | Halsall et al. | 429/54 |
| 4,645,725 | 2/1987 | Kump et al. | 429/179 |
| 4,701,386 | 10/1987 | Kump et al. | 429/179 |
| 4,883,728 | 11/1989 | Witehira | 429/160 |

OTHER PUBLICATIONS

Three page brochure of Pacific Dunlop of Australia showing the Exide Switch battery.
Ten page Dealer Service Bulletin No. 85-POL-1 dated Oct. 25, 1985 regarding the Delco Power Reserve Freedom Battery System.

*Primary Examiner*—Anthony Skapars
*Attorney, Agent, or Firm*—Foley & Lardner

[57] ABSTRACT

The invention provides a vehicle battery system including a main and a reserve battery disposed within a battery housing (10) having conventional external dimensions and battery terminal locations. An illustrated embodiment includes a main battery, comprising a series of thin, flat cells (38) disposed along a first axis, and a reserve battery, comprising a series of cells (42) disposed along a second axis transverse to the first axis. An electrical circuit facilitates selective communication between the reserve battery and the vehicle starter in accordance with the position of a switch assembly (100). An electrically conductive fastener is disposed to simultaneously maintain electrical communication between a main battery termination and an external battery terminal and also between a reserve battery termination and the same external battery terminal.

20 Claims, 11 Drawing Sheets

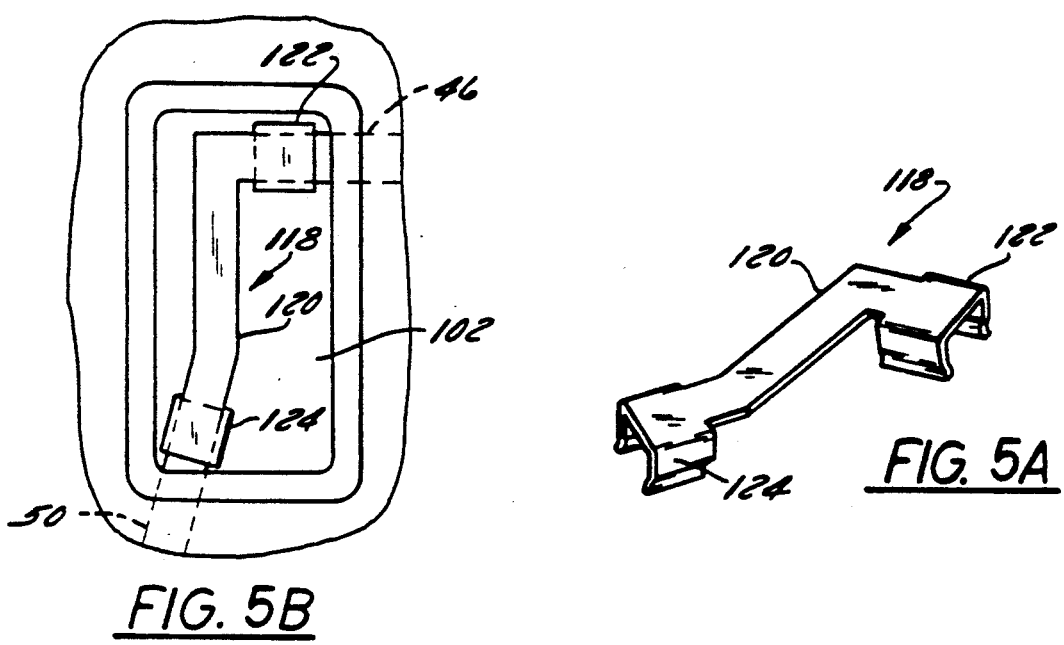
FIG. 5A
FIG. 5B
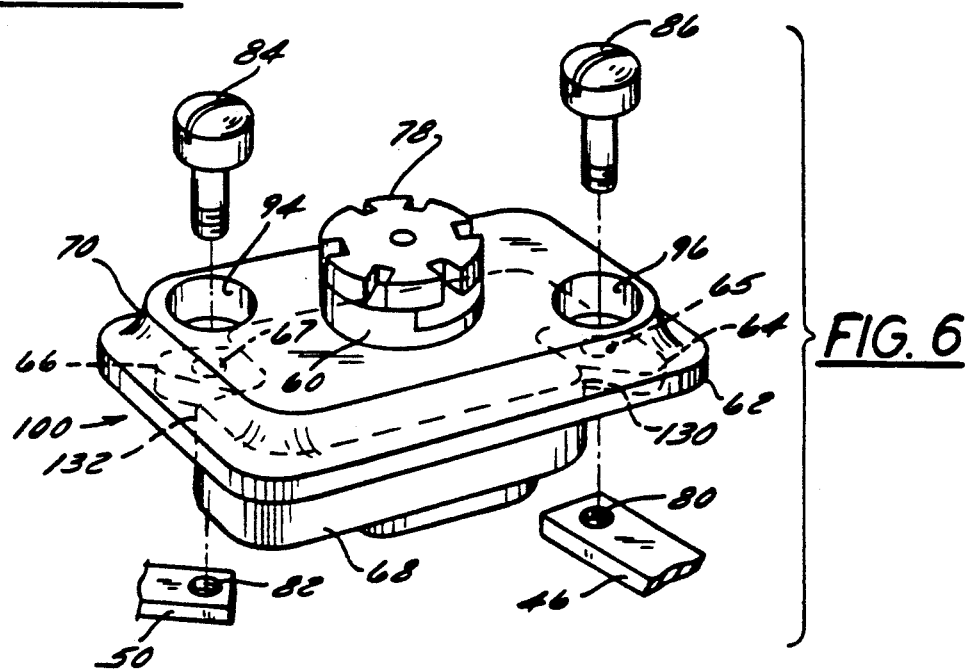
FIG. 6
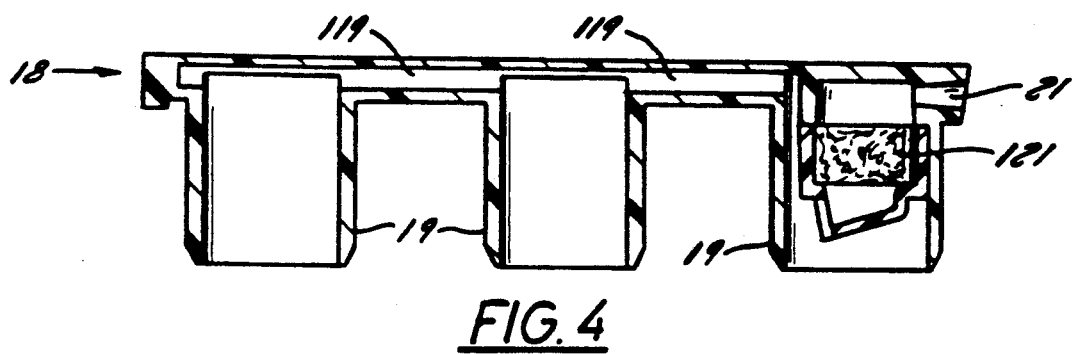
FIG. 4

DUAL BATTERY SYSTEM

This is a continuation of application Ser. No. 07/472,908 filed Jan. 31, 1990, abandoned, which is a continuation in part of Ser. No. 365,084 filed Jun. 12, 1989, now abandoned.

BACKGROUND OF THE INVENTION

1. Technical Field

The present invention relates, generally, to rechargeable battery systems including a main and a reserve battery disposed for intermittant electrical communication.

2. Background Art and Technical Problems

Vehicle battery systems having a main and a reserve unit, separated by a one-way diode for maintaining the reserve unit in the charged condition during non-use, are generally known. The diode allows current to flow from the vehicle generator into the reserve battery, but prevents the reserve battery from discharging through the current path including the diode. Diodes are problematic, however, in that they exhibit a limited current carrying capacity. Diodes having a relatively low current carrying capacity may be blown if excessive current is driven therethrough, whereas diodes having higher current ratings typically dissipate correspondingly large amounts of thermal energy. For example, commercially available diodes typically exhibit a voltage drop of approximately 0.7 volts thereacross. Thus, a diode having 25 amps running therethrough radiates approximately 17.5 watts. Consequently, various design parameters associated with the diode environment, for example, proximity to plastics and volatile chemicals, availability of heat sinks, diode size, and production costs are circumscribed by the heat-generating character of diodes.

In the context of the dual battery of the present invention, the terms "reserve unit" and "reserve battery" refer to a low cycle auxiliary battery configured for intermittent use, as distinguished from "reserve capacity," a term of art referring to the length of time a battery is capable of delivering, for example, twenty-five (25) amperes under given conditions. Furthermore, it will be understood that the word "termination" as used herein describes an electrical contact associated with a battery element, typically an element located at an end of a battery (the terminal element). Each terminal element may have one or more terminations associated therewith for carrying current to or from the battery. Each individual battery generally has a positive termination associated with one end thereof and a negative termination associated with the opposite end. Terminations which extend through the battery housing for attachment to a load are referred to as terminals, and may be cylindrical, frustroconical, flanged, L-shaped, or D-shaped, for example. Terminations which do not extend through the housing or which do not communicate directly with a load are typically configured for electrical communication with an adjacent battery, and are referred to as "flush terminations".

Prior art dual battery systems have proven unreliable and cumbersome. A switchable dual battery, for example, one disclosed by Pacific Dunlop of Australia, comprises a series of thin, flat, parallel electrode plates. A first portion of the plates comprises the main battery and a second, adjacent portion parallel to the first portion comprises the reserve battery. The two batteries are linked by a switch mechanism for controlling the discharge of the reserve unit. Each battery purportedly delivers 12 volts, the main battery being rated at 370 CCA (cold crank amps) and the reserve battery at 115 CCA. The two batteries are electrically configured in parallel, with a one-way diode disposed therebetween to prevent the reserve unit from discharging during periods of non-use. A manually operable switch is interposed between the two batteries, in parallel with the diode, to bypass the diode when it is desirable to discharge the reserve unit. If the switch is inadvertently left in bypass (shunt) mode, however, the reserve unit will discharge along with the main unit, thereby impairing the ability of the reserve unit to function as an auxiliary starting battery. When the switch is open, on the other hand, the diode may be blown if excessive current is drawn therethrough during charging of the reserve battery.

A Power Reserve Battery system, bearing the name DELCO POSIPOWER, has been observed in certain 1985 model automobiles. The battery housing has three external terminals extending from the cover: a main battery positive terminal; a reserve (starter) battery positive terminal; and a common negative (ground) terminal.

The negative terminal electrodes of each battery in the DELCO POSIPOWER system are purportedly connected through a link in the battery housing cover assembly. Thus, a vehicle electrical system requires three cables to accomodate the POSIPOWER system. The cable from the positive terminal of the reserve battery is connected to a solenoid which is activated during starting; the solenoid and starting circuit are located in a control box remote from the battery housing. Each time the ignition key is turned to the "start" position, the main battery latches the solenoid to bring the reserve battery into parallel with the main battery. When the cranking cycle is complete, the solenoid unlatches, again isolating the reserve battery. In the event the main battery lacks sufficient power to energize the latching solenoid, a bypass system, located in the control box, may be manually activated to establish communication between the reserve battery and the starting circuit.

The performance of these prior art battery systems has been unsatisfactory. In particular, retrofitting vehicles to accommodate different sized battery housings, different terminal configurations, or remote circuitry is often cost prohibitive. System reliability may be impaired if diodes with insufficient current-carrying capacity are employed (the diode may be destroyed), whereas safety and performance are compromised when high current capacity diodes are used because of the excessive heat generated thereby. Moreover, presently known dual battery configurations do not permit disposition of two batteries, each capable of delivering sufficient power to start a vehicle, within a housing defined by a conventional vehicle battery envelope and having terminal locations designed to accommodate conventional vehicle cable configurations.

SUMMARY OF THE INVENTION

A preferred embodiment of the switched emergency battery system of the present invention provides a main battery in selective electrical communication with a reserve battery, the system being disposed within a housing characterized by conventional external dimensions and wherein the terminals are disposed to accommodate conventional vehicle cable configurations. Efficient utilization of the available space within a conventional battery housing envelope (i.e., conventional external dimensions) allows the main battery to exceed SAE recommended minimum CCA output ratings for most original equipment manufacturer (OEM) vehicles, for example, a thirty (30) second start cycle at 0° C., while allowing the reserve unit to provide sufficient CCA output for a plurality of start cycles each in the range of approximately ten (10) seconds. The use of a conventional battery housing envelope facilitates relatively low cost production through the utilization of existing manufacturing equipment and processes.

In accordance with one aspect of a particularly preferred embodiment, the individual cells of the main battery are disposed perpendicular to the longitudinal axis of the battery housing. The cells of the reserve battery are disposed at one end of and perpendicular to the main battery, so that the positive terminal of the main battery and negative terminal of the reserve battery are disposed along a common lengthwise edge of the housing cover. This configuration renders the subject battery system interchangeable with conventional two-terminal automotive batteries. A highly conductive bus bar, imbedded within the housing cover, connects the negative terminations of both batteries together. A pair of bus bars, one connected to the main battery positive terminal and the other to the reserve battery positive terminal, are also embedded in the cover and terminate at a switch mechanism.

In accordance with another aspect of the invention, the switching mechanism is also disposed within the cover and includes a manually operable actuator for selectively establishing communication between the main and reserve batteries. A one-way diode, in parallel with the switch, prevents the reserve battery from discharging when the switch is open, but allows current to pass through the diode to maintain the reserve battery in the charged state. A variable resistance, positive temperature coefficient (PTC) resistor is disposed in series with the diode to limit the amount of current flowing therethrough, and, hence, the amount of heat generated by the diode.

According to a further aspect of the invention, the switched emergency battery system is configured for disposition within a vehicle for electrical communication with conventional vehicle battery cables. In the event the main battery output is too low to start the vehicle, the operator manipulates the switch to the closed position, thereby bringing the reserve battery, which is maintained in the fully charged state by the diode/variable resistor circuit, into parallel with the main battery. Upon starting the vehicle, the operator manipulates the switch back to the open position, thereby preventing further drain from the reserve battery. The main battery will be recharged in the conventional manner during vehicle operation; the reserve battery will be recharged, albeit at a slower rate, through the diode/variable resistor circuit.

According to a further aspect of the invention, an improved dual battery system according to the invention includes a main battery, a reserve battery, and an electrically conductive connector configured to maintain electrical contact between the main and reserve batteries. The connector according to the invention maintains mechanical and electrical contact between, for example, a negative termination of the reserve battery and a negative termination of the main battery, while simultaneously maintaining mechanical and electrical contact with one or both of top or side-mounted negative external battery terminals. The cells of the main and reserve batteries are preferably arranged so that the positive and negative terminations of each battery are located near each other, i.e., negative near negative and positive near positive, allowing a unitary connector to be used instead of bus bars.

BRIEF DESCRIPTION OF THE DRAWING

Preferred exemplary embodiments of the present invention will hereinafter be described in conjunction with the appended drawing, wherein like numerals denote like elements, and:

FIG. 4 is an enlarged cross-section view of an exemplary vent cover having integral vent caps;

FIG. 5A is a perspective view of an exemplary jumper in accordance with the present invention;

FIG. 5B is a top view of the jumper of FIG. 5A, shown in the switch cavity in the battery cover;

FIG. 6 is a perspective view of the switching mechanism in accordance with the present invention;

DETAILED DESCRIPTION OF PREFERRED EXEMPLARY EMBODIMENTS

Figure 1:
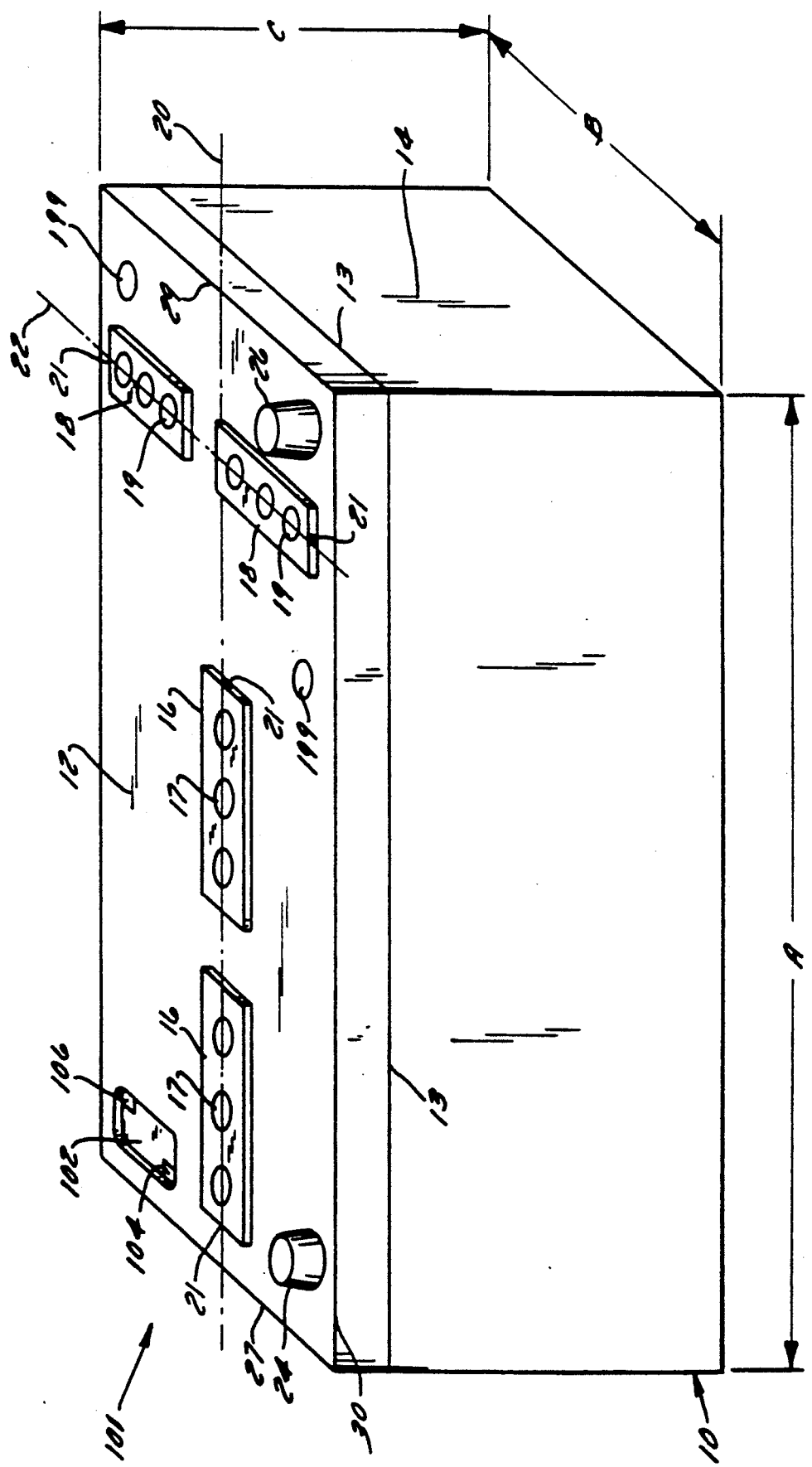
FIG. 1 is perspective view of an exemplary embodiment of a battery system in accordance with the present invention, shown in the fully assembled condition with the switching mechanism removed.

In a particularly preferred embodiment of the switched emergency battery system in accordance with the present invention, the main and reserve units each comprise a lead-acid battery. A lead-acid battery comprises of a number of cells disposed in a container. A series alternating positive and negative electrodes (plates), having separators sandwiched therebetween, are disposed in each cell.

In a preferred embodiment, two separate electrode reactions combine to become the cell reaction, given by:

positive electrode (plate):
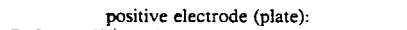
$$PbO_2 + 4H^+ + SO_4 + 2e \rightarrow 2H_2O + PbSO_4$$

negative electrode (plate):
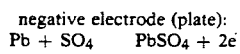
$$Pb + SO_4 \rightarrow PbSO_4 + 2e^-$$

The positive plate suitably comprises lead oxide (the electroactive material) disposed on a lead alloy grid. The negative plate suitably comprises lead as the electroactive material on a lead alloy grid.

Lead alloys employing, for example, antimony may be used as grids for positive plates; lead alloys employing, for example, calcium may be used for negative plates. Cell parameters, such as current acceptance, may vary according to alloy composition. For example, current acceptance may be increased by increasing the antimony content of the alloy. Such increased current acceptance can be advantageous where batteries are operated primarily in cold environments. On the other hand, current acceptance may be decreased by decreasing the antimony content. Decreased current acceptance of a battery may be most advantageous in warm environments.

Individual cells of both the main and reserve batteries may suitably comprise 1.4% lead-antimony alloy (i.e., 1.4% antimony) for the grid of the positive plates and 0.1% lead-calcium alloy (i.e., 0.1% calcium) for the grid of the negative plates. Impurities such as tin and aluminum may also be present. The main and reserve batteries may comprise dissimilar chemistries employing dissimilar lead alloys, as desired, depending on the specific operating conditions of the batteries and/or the vehicle in which they are used.

The electromotive potential of each cell in a particular battery is determined by the chemical composition of the electroactive substrates employed in the electrochemical reaction. For the lead acid chemistry described above, the voltaic potential is approximately two volts per cell, regardless of cell volume. With respect to automotive batteries, vehicles manufactured by original equipment manufacturers (OEM vehicles) typically require a twelve volt battery, which has evolved as the industry standard. Thus, each battery in accordance with the present invention advantageously comprises six cells (6 cells $\times$ 2 volts/cell = 12 volts).

In addition, OEM vehicles are configured for a battery having a conventional envelope, i.e., the external dimensions of a battery are appropriately compatible with the space ("envelope") provided for battery disposition within an OEM vehicle, as described herein. In the context of a dual battery, a threshold problem involves disposing two sets of six cells within a standard envelope such that for each cell, the number of plates per cell is minimized and the current carrying capacity is maximized. From a production standpoint, it is also advisable that the main and reserve batteries employ the same number of plates per cell.

As an initial proposition, the primary battery should have sufficient CCA output, for example 525 amps for a 30 second start cycle at 0° F., to accommodate most OEM vehicles in the class for which the battery is designed. The amount of current (CCA) produced by a two volt cell is a function of, inter alia, the combined surface area of all plates within the cell. Thus, the aggregate plate surface area per main battery cell may be determined once a design CCA is established for the main battery. To the extent that a battery generally may not be charged beyond the point at which the lowest current carrying cell (the limiting cell) is charged, it is also desirable for each cell to have approximately the same current capacity (plate surface area).

The number of plates per cell and the plate dimensions will depend on, inter alia, the size and relative disposition of the reserve battery with respect to the main battery. Once a design CCA is established for the reserve battery, the aggregate plate surface may be determined for each reserve battery cell.

An additional design consideration involves the environment within which the vehicle will be operated. For example, fewer and thicker plates may be used in warmer climates where a lower CCA output is required and susceptability to plate corrosion is greater than in cooler climates.

Having established the desired CCA output for the main and reserve batteries, and hence the aggregate plate surface area for each cell of each battery, it remains to determine the number of plates comprising each main cell and the number of plates comprising each reserve cell, and the relative dimensions (height, width, and thickness) of each "main" plate and each "reserve" plate. In selecting these dimensions, it is noted that the reserve battery is subject to relatively few cycles during its useful life and, thus, the relatively thick plates typically associated with high cycle main batteries are not necessarily appropriate in the reserve battery.

Total production costs can be reduced if the same number of plates are employed in the main and reserve battery cells. In this way, battery production may be streamlined by manufacturing an equal number of main and reserve plates. In addition, the total number of plates used in each cell should be minimized to reduce total cost. For example, each cell may contain in the range of about six (6) to fifteen (15) plates. In a highly preferred embodiment, eleven (11) plates, including for example, six (6) positive electrodes and five (5) negative electrodes, are employed in each cell of each battery.

The present inventors have further determined that, taking all the above factors into account, an optimum ratio of main to reserve CCA output may be achieved when the reserve battery is disposed orthogonal to the main battery, as described herein in connection with a highly preferred embodiment.

Alternatively, the main and reserve plates may be in parallel disposition, or in any other convenient relationship such the respective numbers of main and reserve plates per cell, in conjunction with the respective plate thicknesses, may be selected to yield the desired main and reserve CCA output.

Figure 2:
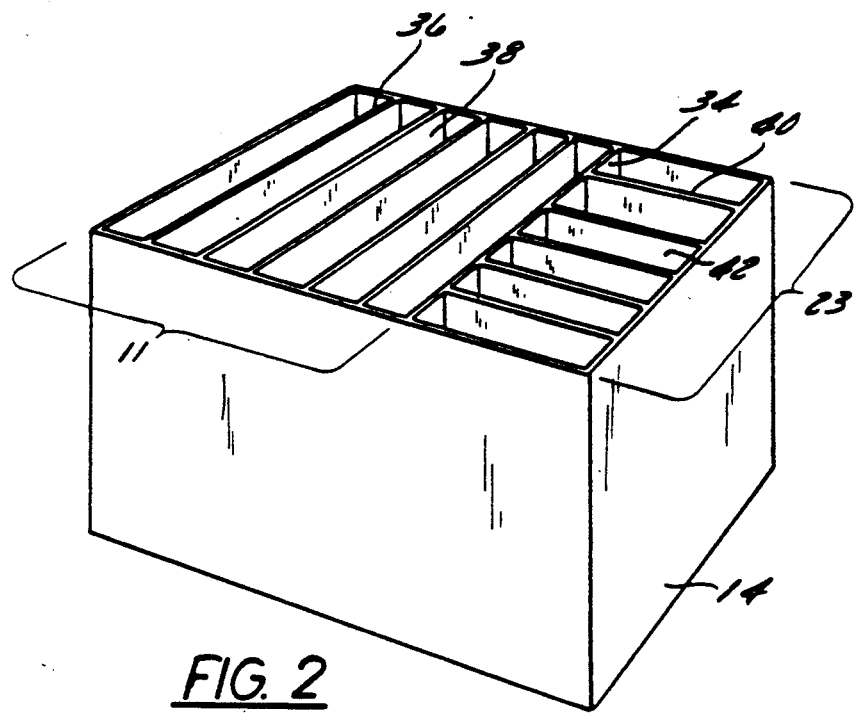
FIG. 2 is a perspective view of the container portion of the battery housing in accordance with the present invention.
Figure 3:
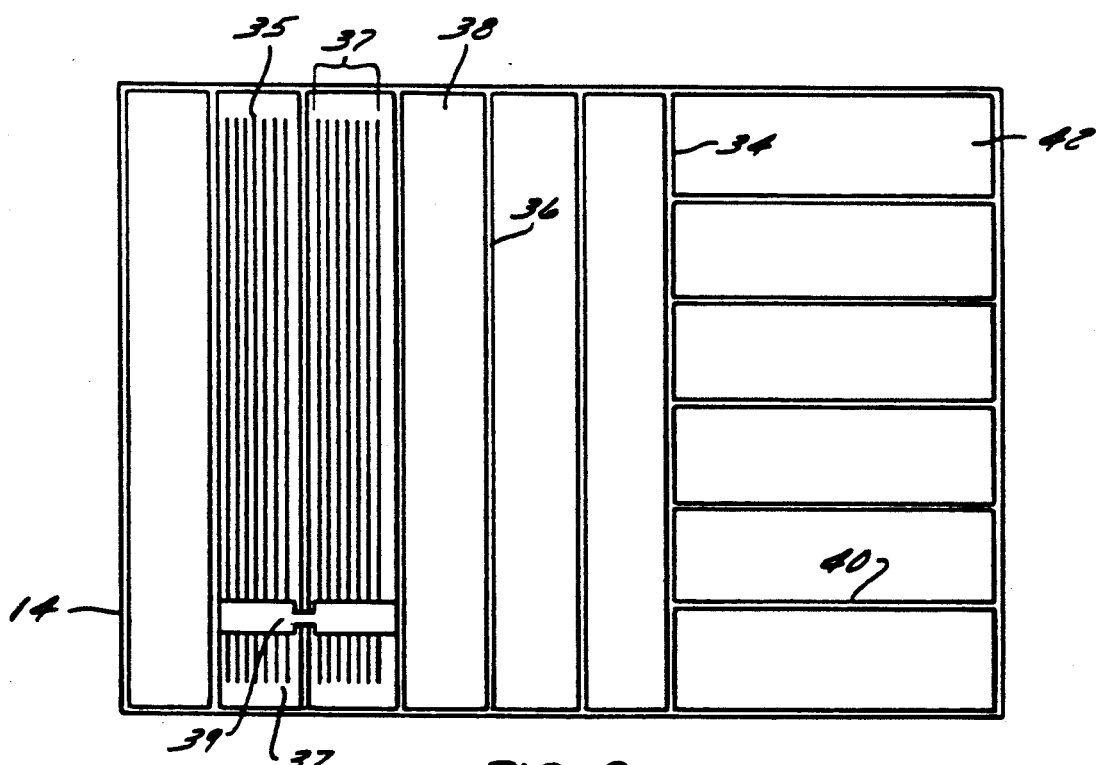
FIG. 3 is a top view of the container of FIG. 2 showing two exemplary elements hard wired together.

Referring now to FIGS. 1-3, the switched emergency battery system 101 in accordance with the present invention suitably comprises a housing 10 including a top portion (cover) 12 and a bottom portion (container) 14, joined together at line 13 during manufacture of the battery, for example by heat sealing in the vicinity of line 13. Container 14 comprises a wall 34 which divides the container into a main battery portion 11, including a plurality of main battery compartments (cells) 38, and a reserve battery portion 23, including a plurality of reserve battery cells 42.

In accordance with a highly preferred embodiment, the main battery is disposed along a main battery centerline (axis) 20 such that respective main battery plates 35 in each main battery cell are disposed parallel to each other and perpendicular to main centerline 20. Main battery centerline 20 is illustratively coincident with the axis of the battery housing, which axis is typically approximately parallel to a line joining the external battery terminals, discussed below.

The reserve battery is illustratively disposed at the right hand side of FIGS. 1-3. The individual cells of the reserve battery are disposed perpendicular to a reserve centerline 22, reserve centerline 22 being substantially perpendicular to main centerline 20. Perpendicular orientation of the main and reserve batteries reflects optimum space utilization within the envelope defined by battery housing 10.

Respective main battery vent caps 16, each comprising a plurality (e.g., three) of vent covers 17, are suitably disposed along main centerline 20, each vent cover 17 communicating with a corresponding main battery cell. Respective reserve battery vent caps 18, each comprising a plurality of vent covers 19, are suitably disposed along reserve centerline 22 in an analogous manner. Respective vent covers 16, 18 further comprise respective apertures 21 for venting the main and reserve batteries, respectively, to the external environment, as discussed in greater detail below in connection with FIG. 4.

Figure 9:
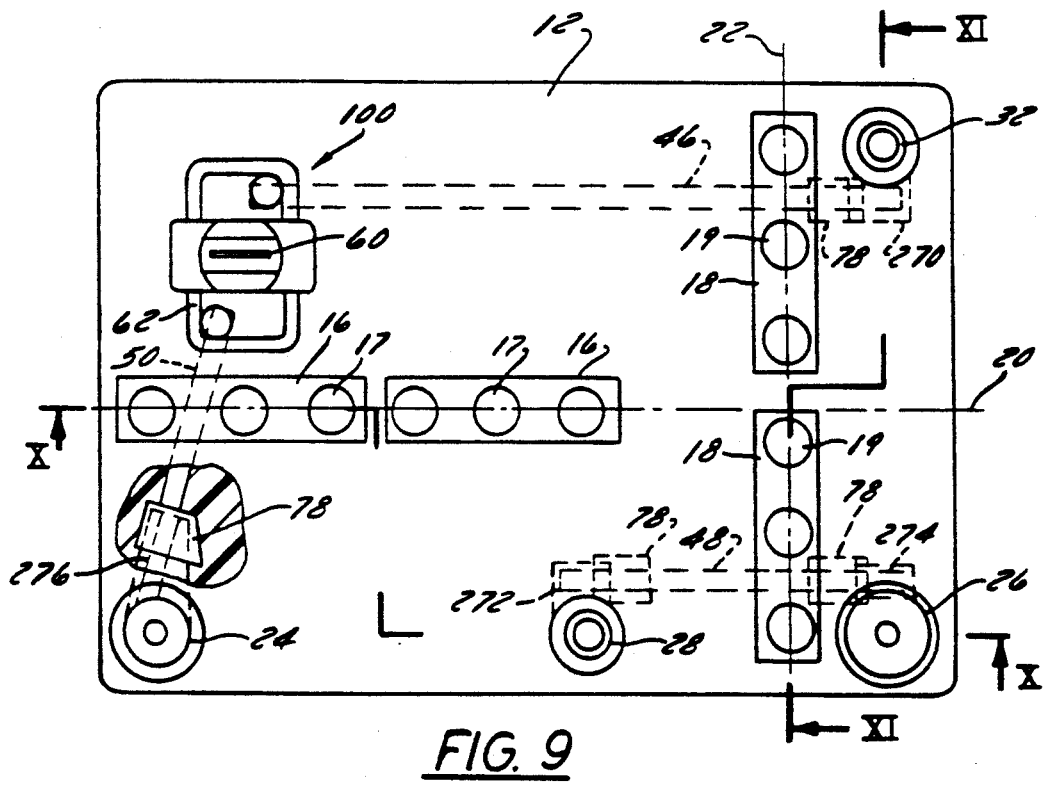
FIG. 9 is a top plan view of the battery housing cover shown in FIG. 1 with the switching mechanism installed.

In accordance with conventional battery terminal configurations, a positive main battery terminal 24 extends from the upper surface of cover 12, near a longitudinal edge 30 thereof, to facilitate attachment to the positive battery cable of a vehicle. Along the same longitudinal edge 30 of cover 12, a negative terminal 26 of the reserve battery extends upwardly through cover 12 for attachment to the negative battery cable of the vehicle (cables not shown). With reference to FIGS. 1 and 9, a negative battery termination 28 of the main battery is disposed along edge 30 of cover 12, but does not protrude therefrom. Similarly, a positive termination 32 of the reserve battery, disposed along an edge 29 of cover 12, does not protrude therefrom.

As discussed in greater detail below, a conductive bus bar 48 connects main battery negative termination 28 to reserve battery negative terminal 26. Thus, electrical communication may be established between both batteries and the vehicle electrical system through terminals 24 and 26, as desired. Respective burn caps 199 are sealed to cover 12 proximate terminations 28 and 32 after respective bus bars 48 and 46 are secured to the terminations, for example, by welding.

In accordance with one aspect of a preferred embodiment of the present invention, the dimensions, configuration, and terminal locations of battery housing 10 are similar (or identical) to those associated with conventional single battery housings, except that terminals 24 and 26 may be disposed immediately adjacent to edge 30. For example, the length (along centerline 20; dimension A in FIG. 1) of battery housing 10 is in the range of about 8 to 12 inches (20.3 to 30.8 cm), and preferably about 10 inches (25.4 cm), and most preferably about 10.3 inches (26.2 cm). The width of battery housing 10 (dimension B in FIG. 1) is preferably in the range of about 5 to 8 inches (12.7 to 20.3 cm), and more particularly in the range of about 7 inches (17.8 cm), and most preferably approximately 6.9 inches (17.5 cm) The height of battery housing 10 (perpendicular to respective centerlines 20 and 22; dimension C in FIG. 1) is in the range of about 5 to 9 inches (12.7 to 22.9 cm), and particularly about 7 inches (17.8 cm). In addition, the distance between the centers of terminals 26 and 28 is in the range of about 7 to 11 inches (17.8 to 27.9 cm), and particularly about 9 inches (22.9 cm), and most preferably approximately 8.9 inches (22.6 cm).

The distance between edge 30 and the centers of terminals 26 and 24 is in the range of about 0.2 to 5 inches (0.5 to 12.7 cm), and particularly about 0.5 to 1.5 inches (1.3 to 3.8 cm), and most preferably about 0.7 inches (1.8 cm). The distance between terminal 24 and the left edge of battery 10 (edge 27), and the distance between terminal 26 and the right edge of battery 10 (edge 29), is in the range of about 0.2 inches to 2 inches (0.5 to 5 cm), and particularly about 0.5 to 1.5 inches (1.3 to 3.8 cm), and most preferably approximately 0.8 inches (2 cm). The distance between the centers of terminals 24 and 26 and centerline 20 is preferably in the range of about 1.5 to 3.5 inches (3.8 to 8.9 cm), and preferably in the range of about 2.5 to 3 inches (6.4 to 7.6 cm), and most particularly approximately 2.7 inches (6.9 cm). Alternatively, terminals 24 and 26 may be centered on centerline 20, or the terminals may extend from a side of cover 12 or container 14, or both.

Figure 12A:
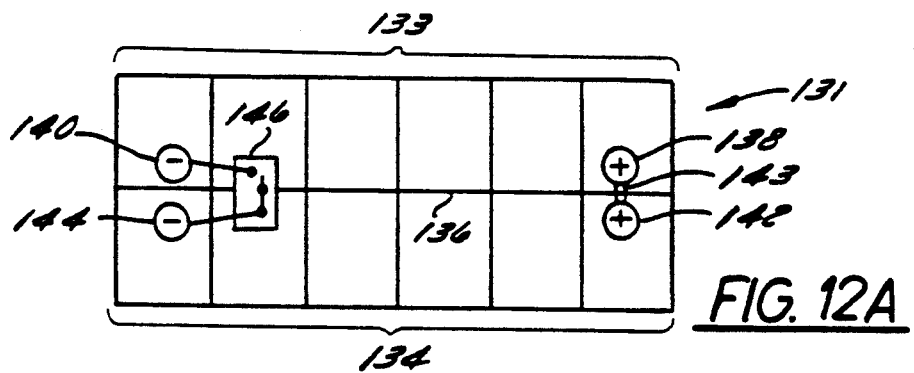
FIGS. 12A-E are top view schematic representations of alternative termination configurations in accordance with the present invention.

Referring now to FIGS. 12A-E, alternative terminal and termination configurations, as well as alternative battery orientations, may be employed in accordance with the present invention. With particular reference to FIG. 12A, a dual battery 131 suitably comprises a main battery 133, having a main battery positive terminal 138 and a main battery negative terminal 140, there being a wall 136 between main battery 133 and a reserve battery 134 including a reserve battery positive termination 142 and a reserve battery negative termination 144. A bus bar 143 connects main battery positive terminal 138 to reserve battery positive termination 142. A switch mechanism 146 is disposed for selectively establishing intermittent electrical communication between terminal 140 and termination 144, and hence between main battery 133 and reserve battery 134. Terminals 138 and 140 advantageously extend through the battery housing, for example from the top of battery 131, or, alternatively, from a side of or from respective ends of the battery.

Figure 12B:
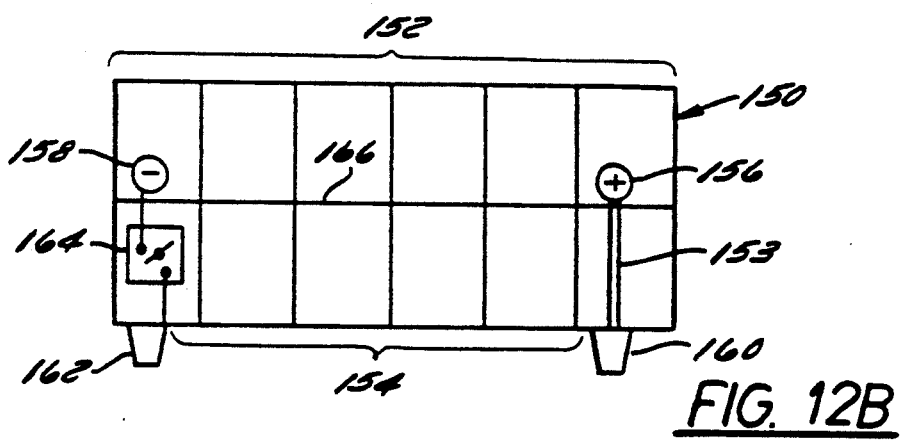

Referring now to FIG. 12B, a dual battery 150 suitably comprises a reserve battery 152, including reserve battery positive termination 156 and reserve battery negative termination 158, separated by a wall 166 from a main battery 154, including a main battery positive terminal 160 and a main battery negative terminal 162. A bus bar 153 connects main positive terminal 160 to reserve positive termination 156. A switching mechanism 164 is disposed to selectively establish electrical communication between reserve battery negative termination 158 and main battery negative terminal 162. Respective main battery terminals 160, 162 may extend from a side of battery 150, as shown in FIG. 12B, or, alternatively, may extend from the top of the battery or from respective ends of the battery, as desired.

Figure 12C:
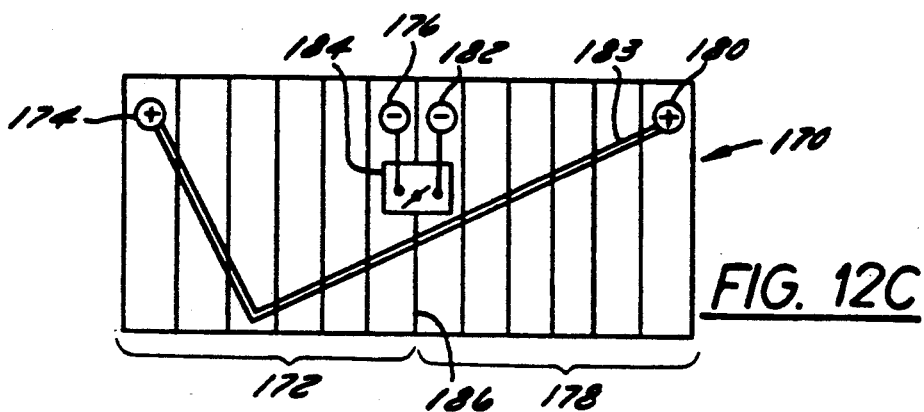

Referring now to FIG. 12C, a dual battery 170 suitably comprises a main battery 172, including main battery positive termination 174 and main battery negative termination 176, and a reserve battery 178, including reserve battery positive termination 180 and reserve battery negative termination 182. A wall 186 is advantageously disposed between the negative terminal electrode of main battery 172 and the negative terminal electrode of reserve battery 178. A bus bar 183 connects respective main and reserve positive terminations 174, 180. A switching mechanism 184 is configured to selectively establish electrical communication between respective negative terminations 176 and 182. In the configuration illustrated in FIG. 12C, main battery termination 174 functions as a terminal for attachment to a vehicle cable. Either main battery negative termination 176 or reserve battery negative termination 182 may function as the other terminal, as desired. Moreover, either or both terminals may extend from the top, side or ends of battery 170.

Figure 12D:
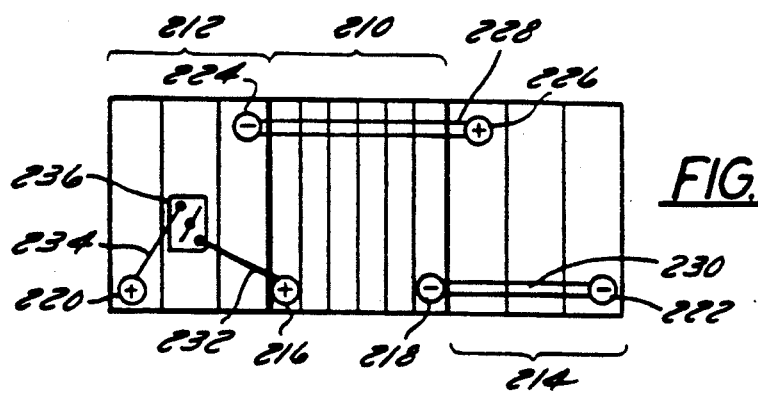

With reference to FIG. 12D, a reserve battery 210, having a positive termination 216 and a negative termination 218, is illustratively interposed between respective portions 212, 214 of a main battery, the main battery having a positive terminal 220 and a negative terminal 222 disposed for attachment to the vehicle cables. A bus bar 228 maintains electrical communication between a positive termination 226 and a negative termination 224 of respective main battery portions 214 and 212. A bus bar 230 similarly maintains electrical communication between a negative termination 218 of reserve battery 210 and negative termination 222 of the main battery. A switch 236 is disposed to bring positive terminal 220 of the main battery into intermittent electrical communication with a positive terminal 216 of reserve battery 210. The thicker cells comprising main battery portions 212 and 214 permit the use of a greater number of plates per cell than in reserve battery 210 or, alternatively, permit the use of thicker plates.

Figure 12E:
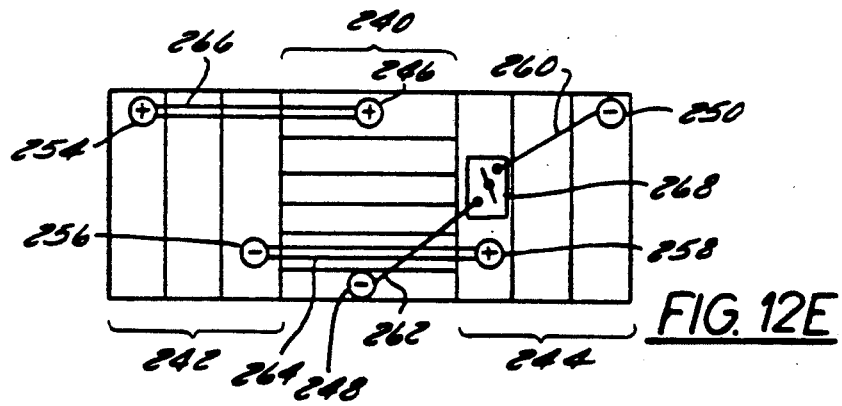

Referring now to FIG. 12E, a reserve battery 240 is illustratively interposed between respective portions 242, 244 of a main battery. A bus bar 266 maintains electrical communication between a positive terminal 254 of the main battery and a positive terminal 246 of the reserve battery. Similarly, a bus bar 264 maintains electrical communication between a positive termination 258 of the main battery and a negative termination 256 of the main battery, such that respective portions 242 and 244 function as a single battery. A switch 268 is disposed to establish intermittent electrical communication between negative reserve battery termination 248 and negative main battery terminal 250 via respective bus bars 262 and 260, respectively. A principal distinction between the dual battery illustrated in FIG. 12E and the dual battery illustrated in FIG. 12D is the relative orientation of the reserve battery with respect to the main battery portions, the main and reserve batteries being substantially coaxial in FIG. 12D whereas the main battery axis is substantially perpendicular to the reserve battery axis in FIG. 12E.

Referring now to FIGS. 2, 3, and 9-11, bottom portion 14 of housing 10, in accordance with one aspect of a preferred embodiment of the present invention, is essentially divided into two separate battery chambers by wall 34. On the left side of wall 34, a plurality of thin, flat, spaced apart partitions 36 define a plurality of main battery cell compartments (cells) 38 therebetween. Respective main battery frustoconical conduits 52, integral with cover 12, are disposed above and extend into a corresponding main battery cell 38 to facilitate the introduction of electrolyte thereinto.

On the right hand side of wall 34, a plurality of reserve battery cell partitions 40 define a series of reserve battery cell compartments 42 therebetween. Respective reserve battery frustoconical conduits 54 (FIG. 11) extend into respective compartments 42 to facilitate the introduction of electrolyte thereinto, which electrolyte may be the same as or different from the electrolyte employed in the main battery inasmuch as the two batteries are hydraulically isolated by wall 34.

Figure 10:
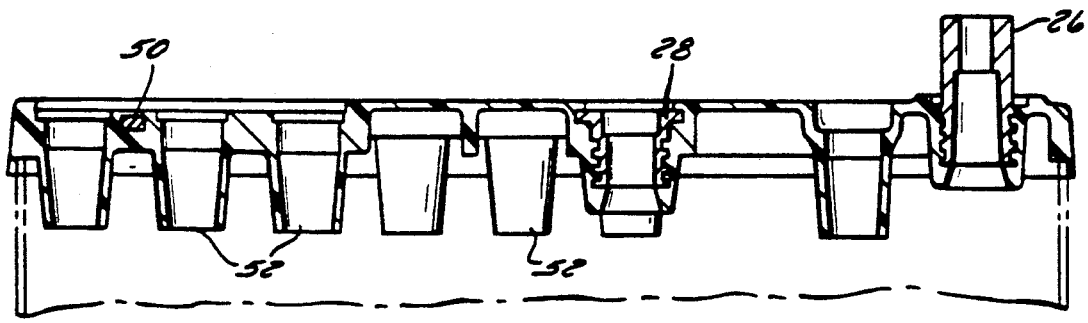
FIG. 10 is a cross-section view of the cover taken along line X—X in FIG. 9, showing a portion of the main battery fill holes, a bus bar, and an external battery terminal.
Figure 11:
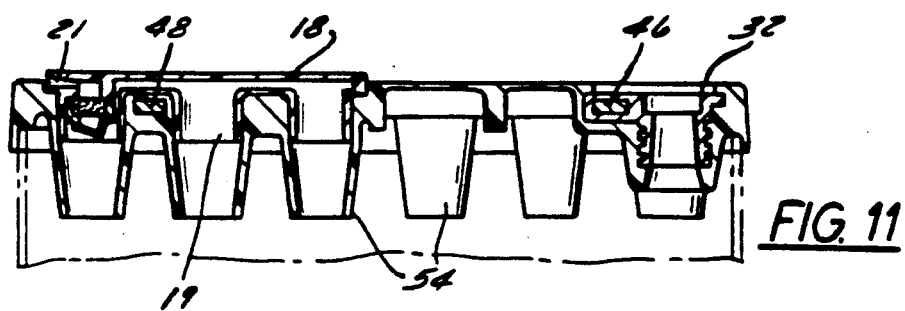
FIG. 11 is a cross-section view of certain of the reserve battery fill holes, including the vent cover and integral vent caps, taken along line XI—XI in FIG. 9.

Respective vent caps 16 and 18 are similar in structure and function. For purposes of illustration, main battery fill holes 52 are shown in FIG. 10 with vent cap 16 removed. FIG. 11 shows reserve battery fill holes 56 with vent cap 18 in place.

With reference to FIG. 4, an exemplary embodiment of vent cap 18 suitably comprises a plurality, e.g., three, of integral vent covers 19 extending therefrom. Respective vent covers 19 are configured for disposition within frustoconical projections (fill hole conduits) 54, as shown in FIG. 11. Thus, each of respective projections 19 forms an extension of each conduit 54. Adjacent projections 19 are connected by a common manifold 119 which terminates at aperture 21.

As best seen in FIG. 4, cap 18 is configured to minimize the possibility of electrolyte leakage from a cell to the external environment. At the same time, each cell communicates with the external environment, through conduit 119 and aperture 21, thereby preventing excessive pressure within the battery resulting from, for example, gas generation due to overcharging or self discharging or changes in temperature. In addition, a flame protection device 121 is incorporated into one or more of vent covers 19.

Flame protection device (flame arrestor) 121 suitably comprises a microporous polyethylene disk, advantageously disposed proximate aperture 21. In the embodiment shown in FIG. 4, a single flame arrestor 121 is incorporated into one of the end vents 19 in each cap 18, although a greater number may be employed.

Manifold 119 comprises a continuous pathway extending the length of cap 18. Thus, any flame which may be inadvertently produced by an external source is prevented from entering any of the battery cells, thereby minimizing the risk of explosion. Respective vent caps 16 cooperate with main battery frustoconical fill holes 52 in a similar manner.

Returning now to FIGS. 1-3, a plurality of main battery plates 35 comprise a main battery element 37. One element 37 is disposed within each cell 38 for electrochemical interaction with the main battery electrolyte. The reserve battery plates (not shown) are disposed within each cell 42 in an analogous manner. As explained above, the material composition, number, and size of the reserve battery plates may be the same as or different from the main battery plates, depending on such factors as, for example, main and reserve battery chemistry, the CCA ratio between the main and reserve batteries, and the operating envelope.

In a preferred embodiment, each cell delivers a voltaic potential of approximately two volts. Thus, the main battery and the reserve battery each deliver 12 volts. Although six main battery cells and six reserve battery cells are shown in the illustrated embodiment, those skilled in the art will appreciate that each of the main and reserve batteries may comprise more or less than six cells, depending on, inter alia, the chemistries employed and the desired voltage of each battery.

With continued reference to FIGS. 1-3, housing 10 is suitably made from a resilient, temperature resistant material such as, for example, polyethylene, polyurethane, polystyrene, polypropylene, various copolymers thereof, Noryl, ABS, hard rubber, or various polycarbonates. Strong, light-weight material is highly preferred. In addition, the material should be capable of being heat sealed or vibration welded, or, alternatively, compatible with epoxies or solvents.

With specific reference to FIGS. 9-11, cover portion 12 illustratively comprises an integral unit, having various elements of the battery electronics molded therewithin. Prior to manufacture of cover 12, each termination is joined to a conductive bus bar for carrying current to and from the termination. Specifically, a conductive extension 70 of termination 32 is formed around one end of a first bus bar 46, for example by placing the end of the bus bar in a mold or die and introducing molten or softened lead thereinto. In a similar manner, a conductive extension 274 of termination 26 is formed around one end of a second bus bar 48, and an extension 272 of termination 28 is formed about the opposite end of bus bar 48. One end of a third bus bar 50 is joined to an extension 276 of termination 24, the opposite end of bus bar 50 being disposed within a switch mechanism 100, as discussed in greater detail below. Switch mechanism 100 also receives the end of bus bar 46 remote from termination 32. As best seen FIGS. 10 and 11, negative termination 28 of the main battery and positive termination 32 of the reserve battery need not extend upwardly beyond the upper surface of cover 12.

As best seen EIGS. 10 and 11, bus bars 46, 48 and 50 are suitably rectangular in cross-section and are preferably made from a highly conductive material, for example, copper. In this way, ohmic losses within the battery are minimized, thus providing maximum voltaic potential to the load. Inasmuch as copper is generally incompatable with acidic electrolyte, the bus bars are advantageously isolated from the electrolytic environment, for example by being embedded within cover 12 during manufacture thereof, for example, by an injection molding process.

Referring now to FIGS. 1 and 6-9, switch assembly 100, configured for disposition within a switch cavity 102 in cover 12, suitably comprises a manually operable switching mechanism 60 rotatably mounted within a switch housing 62. Alternatively, manual switch mechanism 60 may be a toggle switch, a push button, or any other convenient mechanism for effecting selective actuation. In an alternate embodiment, the switch mechanism may comprise a remotely actuable mechanism comprising, for example, a solenoid or an SCR.

Switch housing 62 suitably comprises a seating member 68 joined to a cover portion 70, there being an O-ring 72 disposed about the periphery of housing 62 proximate the junction between seat 68 and cover 70.

Figure 7:
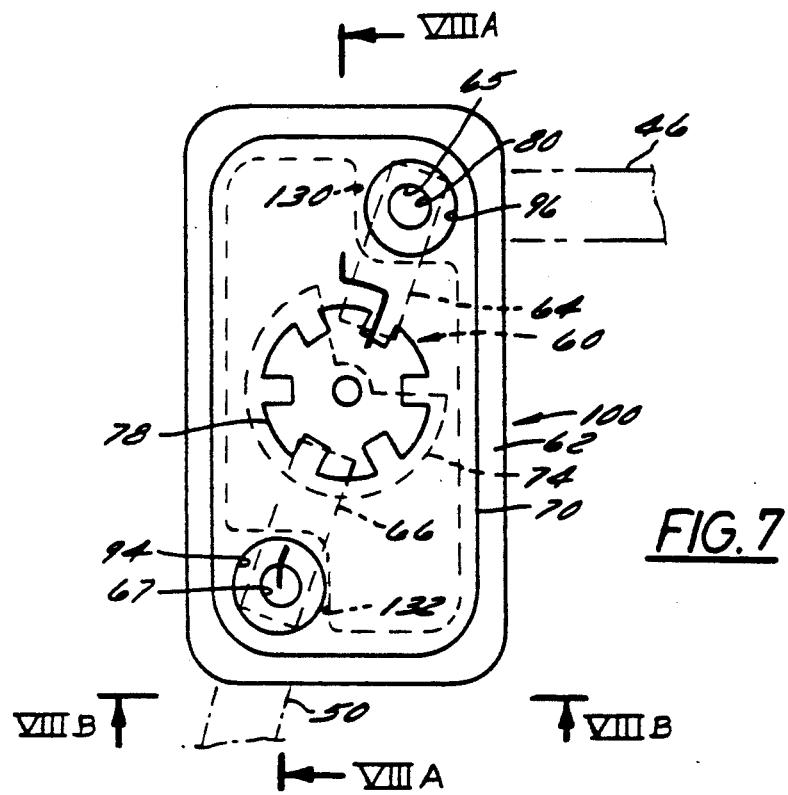
FIG. 7 is a top plan view of the switching mechanism shown in FIG. 6.

O-ring 72 protects the switching contacts and the bus bars which they engage (discussed below) from any impurities which might otherwise enter cavity 102. As best seen in FIGS. 6 and 7, top portion 70 is generally rectangular, whereas bottom portion 68 has two diagonally opposed indentations 130, 132 which allow respective ends of bus bars 46 and 50 to be conveniently connected to the switch contacts when switching mechanism 100 is installed within cover 12, as explained below.

Respective first and second switch contacts 64 and 66 are disposed for engagement with respective ends of bus bars 46 and 50, to facilitate selective electrical communication between the main and reserve battery in accordance with the position of mechanism 60.

Figure 8A:
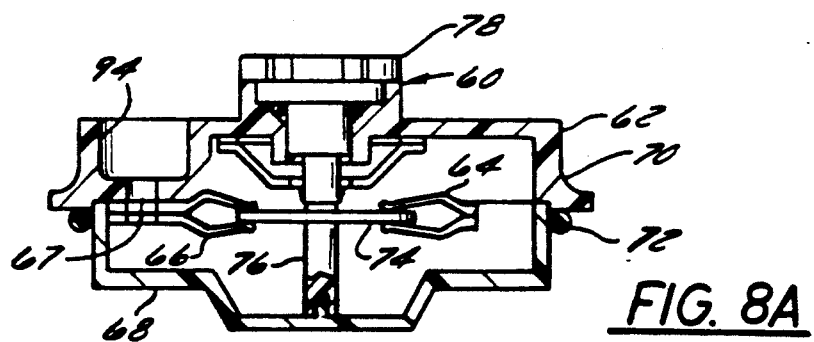
FIG. 8A is a cross-section view of the switching mechanism taken along line VIIIA—VIIIA in FIG. 7.
Figure 8B:
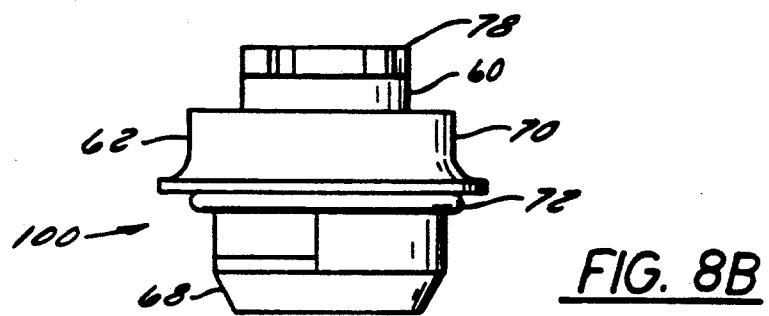
FIG. 8B is an end view of the switching mechanism taken along line VIIIB—VIIIB in FIG. 7.

More particularly, an actuator 78 is disposed at a first end of a rotatable shaft 76, the opposite end of which is mounted to seating member 68 (FIG. 8A). A cam 74 is mounted on shaft 76 for rotation therewith. Cam 74 is configured for slidable engagement with switch contacts 64 and 66, such that cam 74 maintains mechanical and electrical contact with one of the contacts, for example contact 66, throughout the range of rotation of shaft 76. The contour of cam 74 is selected so that it engages contact 64 in the "switched on" position. Mechanical and electrical contact between cam 74 and contact 64 is terminated when manual actuator 78 is rotated to the "switched off" position.

A screw hole 80 (FIG. 6) is disposed near the end of bus bar 46 to facilitate attachment to contact 64 of switch 100. A screw hole 82 is disposed in bus bar 50 for attachment to contact 66 in a similar manner. During assembly, switch housing 62 is inserted into switch cavity 102 in cover 12, respective mating holes 65, 67 in switch contacts 64, 66 being aligned with respective holes 80 and 82 in bus bars 46 and 50. As described above, respective indentations 130, 132 of seat member 68 are removed to facilitate convenient manipulation of contacts 64, 66 into registration with bus bars 46, 50. A screw 84 is thereafter inserted into clearance hole 94 in cover portion 70 of the switch housing; guided through hole 67 in switch contact 66; guided through hole 82 in bus bar 50, and secured in a mounting hole 104 located at the bottom of cavity 102 in cover 12 (FIG. 9). Similarly, a screw 86 is guided through a clearance hole 96 in cover 70; hole 65 in switch contact 64; hole 80 in bus bar 46; and secured in a mounting hole 106 in cover 12. Electrical contact is thereby established between bus bar 46 (and hence the reserve battery) and switch 100, as well as between bus bar 50 (and hence the main battery) and switch 100.

It is generally well known that the stored voltaic potential in electrochemical batteries tends to diminish over time even if the battery terminals comprise an open circuit. Thus, the mere presence of a reserve battery configured for selective actuation provides limited practical utility; the CCA capacity of the battery will deplete, over time, in the absence of either an intermittent or constant, low level, protective charge maintainence system.

Intermittent charging sources which require the operator to periodically monitor and replenish the reserve power capacity are cumbersome and tend to be neglected, thus leaving a reserve battery vulnerable to depletion. In accordance with one aspect of the invention, an electric circuit allows the reserve battery to be charged, at a generally low rate, while the vehicles generator is functioning.

Figure 13:
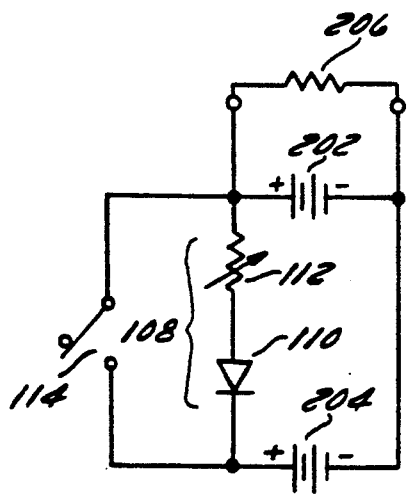
FIG. 13 is a schematic circuit diagram of the system electronics in accordance with one aspect of the present invention, shown in the battery discharge (vehicle starting) condition.

Referring now to FIG. 13, an electric circuit corresponding to the system electronics suitably comprises a reserve battery 204 disposed in parallel with a main battery 202 for delivering power to a load 206, for example the starter mechanism of an automobile. A unidirectional current path 108 suitably comprises a diode 110 and an overcurrent protection device 112, suitably a variable resistor, polyswitch, solid state transistor, thyristor, or any device which selectively limits current through the diode.

In a highly preferred embodiment, variable resistor 112 comprises a model RXE065 PTC positive temperature coefficient (PTC) resistor available from the Raychem Corporation. The resistivity of resistor 112 advantageously changes dramatically as a function of temperature, or more particularly, of power dissipation inasmuch as resistor 112 radiates thermal energy as a function of power passed therethrough. A selectively operable shunt current path 114, analogous to switch 100, is disposed in parallel with unidirectional current path 108.

Circuit 108 functions as a protective charge maintenance circuit by allowing a low level current to pass from the vehicle generator to reserve battery 204. At the same time, circuit 108 prevents current from flowing in the opposite direction, thereby maintaining reserve battery 204 in the charged condition during non-use.

FIG. 13 corresponds to the discharge mode, i.e., when main battery 202 is supplying power to the vehicle. During normal starting conditions in which the voltaic potential of main battery 202 is sufficient to deliver adequate current to load 206, shunt 114 remains open and diode 110 prevents current flow from reserve battery 204 to load 206. Thus, battery 204 is effectively isolated from the circuit during the discharge mode when switch 114 is open. When the voltage in battery 202 becomes drained, for example through excessive cranking cycles or if the vehicle accessories are used when the vehicle generator is not running, shunt 114 may be manually switched to the closed position, thereby bypassing unidirectional current path 108 and allowing the voltaic potential of battery 104 to be applied across load 106. After the vehicle has been started, switch 114 should be closed to prevent inadvertent drain of battery 204 through the shunt path comprising switch 114.

Figure 14:
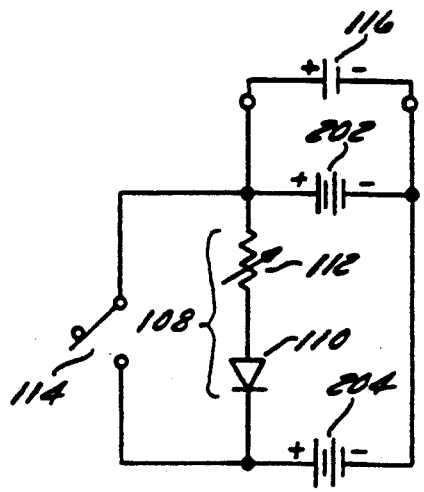
FIG. 14 is a schematic diagram of the circuit of FIG. 13, shown in the battery recharge condition.

Referring now to FIG. 14, the circuit diagram of FIG. 13 is shown in the charge mode, corresponding to operation of the vehicle generator. FIG. 14 differs from FIG. 13 in that, rather than load 206 being disposed across the output terminals, a voltage source 116, for example, the generator/alternator system of the vehicle, is disposed thereacross to supply a positive potential to batteries 202 and 204, thereby recharging them, as necessary. In the charge mode, if shunt 114 is closed, batteries 202 and 204 will simultaneously recharge in accordance with their respective voltaic potentials. Inasmuch as the shunt path provides essentially zero electrical resistance, no current flows through unidirectional current path 108.

With continued reference to FIG. 14, when shunt path 114 is open, voltage source 116 causes current to flow downwardly through unidirectional current path 108 to recharge battery 204 (battery 202 will recharge in any event). To protect diode 110, variable resistor 112 is placed in series therewith to limit the amount of current flowing through the diode.

Diodes generate a significant amount of heat as current flows therethrough. In a battery environment, sources of excessive heat are undesirable inasmuch as battery housings and vehicle electrical cables are often made from plastic or rubber. Moreover, the electrolyte may produce volatile gasses under certain conditions, for example, during battery self discharge. Therefore, a mechanism is needed for keeping the temperature of diode 110 within desired limits. Diode 110 and resistor 112 are beneficially selected to maintain thermal radiation at a minimum while supplying sufficient recharge current, for example, 0.1-2 amps, to the reserve battery.

Figure 15:
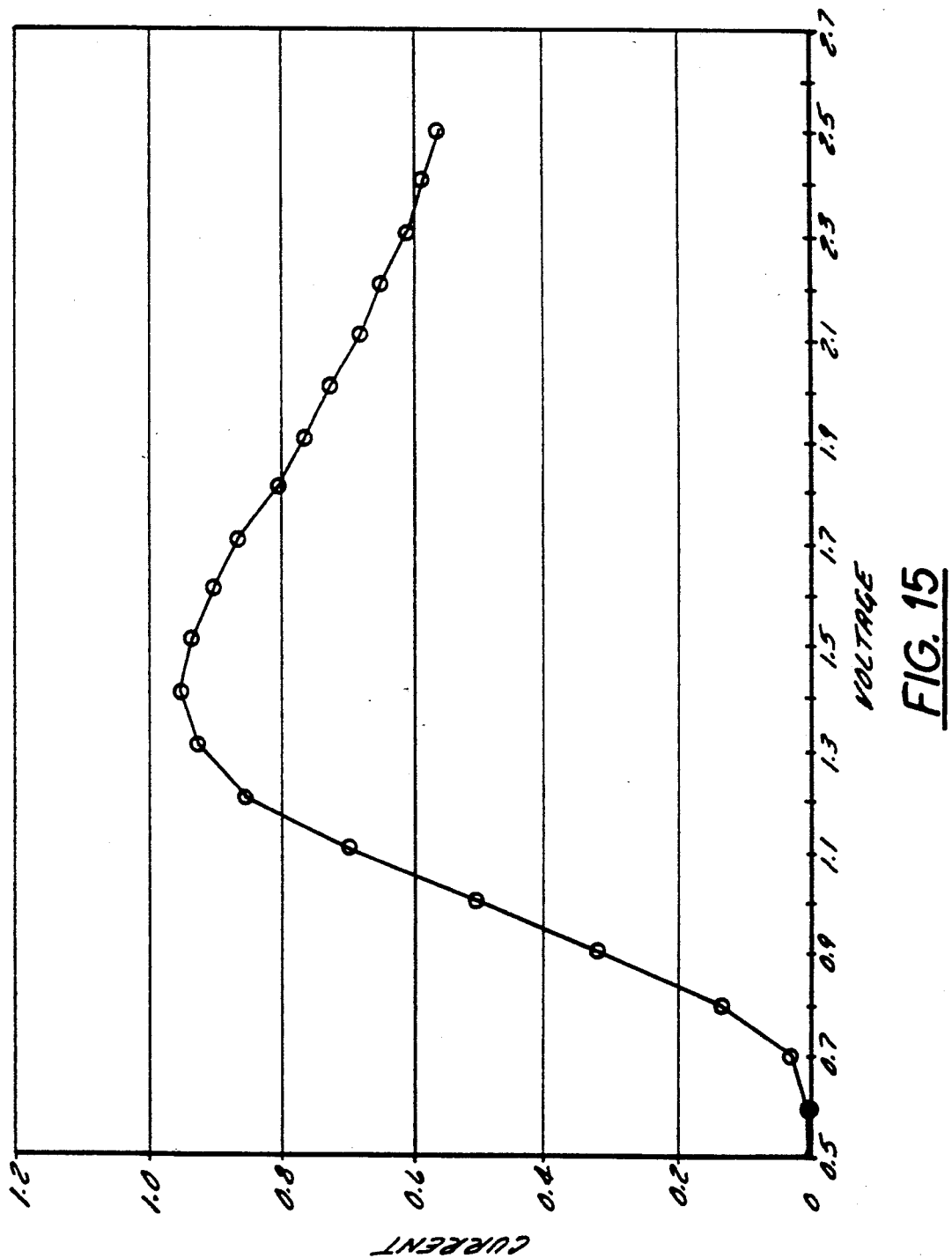
FIG. 15 is a graphical representation of the voltage-current relationship of an exemplary resistor and diode combination.

FIG. 15 illustrates a desired exemplary voltage-current relationship for circuit 108. To the extent vehicle batteries typically undergo extended periods of recharging during vehicle operation, a small amount of current through unidirectional current path 108 is generally sufficient to maintain battery 104 in the charged condition.

More particularly, a voltage differential of about 0.1 to 60 volts, and more particularly about 0.2 to 2.5 volts, is typically maintained across path 108 when switch 114 is open. Resistor 112 is selected to exhibit a resistance on the order of about 0.1 to at least 5 ohms at low voltage levels. This results in current levels in the range of about 0.1 to 25 amperes, particularly about 0.3 to 3 amperes, and most preferably about 1 ampere, through path 108 to recharge battery 104.

As the current flowing through path 108 increases, the resistence exhibited by resistor 112 sharply increases, to approximately 5-10 ohms at current levels in excess of approximately 2 amps. Thus, variable resistor 112 effectively limits the amount of current which travels through, and hence the amount of heat generated by, diode 110.

In accordance with another aspect of the present invention, resistor 112 and diode 110 are sufficiently small to facilitate convenient disposition within cavity 102 in cover 12. Cavity 102 suitably has a width in the range of 1 to 3 inches (2.5 to 7.6 cm) and preferably about 1.2 inches (3.1 cm); a length in the range of about 2 to 3 inches (5.1 to 7.6 cm) and preferably about 2.1 inches (5.3 cm); and a depth (into cover 12) in the range of about 0.2 to 1 inch (0.5 to 2.5 cm), preferably about 0.6 inches (1.4 cm).

An important advantage associated with the subject battery is that existing manufacturing capacity techniques, and equipment presently allocated for conventional batteries may be modified to produce the battery system described herein. A preferred method of manufacturing the dual battery in accordance with various aspects of the invention involves injection molding the cover and container portions of the battery housing, inserting the battery plates into the cells of the container, and thereafter heat sealing or vibration welding the cover portion to the container portion of the housing.

The manufacturing process begins with a mold corresponding to cover portion 12. A conductive linking apparatus is disposed within the mold prior to the injection of plastic thereinto. The conductive linking apparatus suitably comprises bus bars 46, 48, 50, terminations 28, 32, and terminals 24 and 26 (See FIGS. 1 and 9-11). More specifically, termination 32 suitably comprises a lead extension 270 into which an end of bus bar 46 is received. Similarly, termination 28 suitably comprises a lead extension 272 within which a first end of bus bar 48 is received, the second end of bus bar 48 being received within a lead extension 274 integral with terminal 26. A similar lead extension 276, integral with terminal 24, suitably receives one end of bus bar 50.

As best seen in FIG. 9, the region in which respective extensions 270, 272, 274 and 276 are configured about respective ends of bus bars 46, 48, and 50 are advantageously enclosed within respective corrosion resistant plastic sleeves 78. Sleeves 78, suitably made from a chlorinated polyolefin, protect the regions in which the bus bars are received by the lead extensions from inadvertent contact with electrolyte. Furthermore, to the extent the copper bus bars exhibit different thermal expansion characteristics than the cover, container, terminations, terminals, and lead extensions, the bus bars are permitted to slide freely within cover 12.

After the above-described conductive linking apparatus is inserted into the mold, plastic is injected thereinto, thus forming cover 12 with the linking apparatus embedded therein. Container 14 is suitably made by an injection molding process, as is well known in the art.

The molds are desirably water jacketed to facilitate a cooling cycle following the injection of plastic into the mold. After a predetermined cooling time, the cover is removed from the mold and a jumper 110 is inserted into the switching cavity.

Referring now to FIGS. 5A and 5B, jumper 118 suitably comprises a shaft portion 120 having respective spring clips 122, 124 disposed at respective opposite ends thereof. Jumper 118 is advantageously configured so that, when inserted into cavity 102, clip 122 removably engages bus bar 46 and clip 124 removably engages bus bar 50. Jumper 118 is desirably made from a highly conductive material, thereby facilitating electrical communication between bus bars 46 and 50, and hence, between the main and reserve batteries. Jumper 118 functions as a "dummy" switch during initial charging of the battery system by temporarily maintaining electrical communication between the two batteries. As a result, switch mechanism 100 can be safely, reliably, and efficiently installed into a completed battery without having to withstand the manufacturing process.

After jumper 118 is secured in place, cavity 102 may be covered with protective tape to prevent debris from entering the cavity. In this condition, the cover is ready to be joined to a container, there being a complete electrical circuit within cover 12 by virtue of the contact made between bus bars 46 and 50 via jumper 118.

Prior to joining cover 12 to container 14, the battery elements are inserted into the main and reserve battery cells. For purposes of illustration, two exemplary main battery elements 37 are shown in FIG. 3; however, it will be understood that an element is disposed in each cell of each battery during assembly. Thus, twelve elements are placed into the twelve cells of container 14 (six cells in each of the main and reserve batteries). Each element (see FIG. 3) comprises an alternating series of positive and negative electrodes (plates) 35 having separators (not shown) interposed therebetween. In a preferred embodiment, each element is configured with a positive electrode plate at both ends thereof, such that every element comprises an odd number of total plates (positive and negative electrodes), and further, each element has one more positive plate than negative plates. In a highly preferred embodiment, each element comprises six (6) positive and five (5) negative electrodes, for a total of eleven (11) plates.

All of the positive plates within a particular cell are electrically connected in parallel, forming a current bus, for example by a wire extending from each positive plate. Each negative plate within a particular cell is similarly connected to every other negative plate within the same cell. Thus, two current busses, one positive and one negative, extend from each cell.

The negative current bus of each cell is hard wired to the positive current bus of an adjacent cell, forming a hard wired connection 39. Hard wiring entails establishing a permanent current path between adjacent elements, for example by twisting, soldering, crimping, welding, or fusing the current busses together. In a preferred embodiment, a total of ten (10) hard wired connections are made within container 14 (five hard wired connections within each of the main and reserve batteries.

Interior battery cells, i.e., cells which are not located at an end of the battery, have an adjacent cell on each side thereof. Thus, both the negative and positive current busses extending from interior cell elements are hard wired to an adjacent element. The end cells (terminal cells), on the other hand, only have one adjacent cell. Accordingly, the end cell at one end of each battery includes a free positive current bus, and the end cell at the opposite end of the battery includes a free negative current bus.

The negative and positive current busses associated with the main and reserve batteries are joined with the corresponding negative and positive terminations in cover 12 when the cover is joined to container 14. Depending on the manner in which the current buses are fused to the terminations, fusion may occur prior to, during, or after cover 12 is sealed to container 14. Fusion may be accomplished through resistance heating, friction welding, or, alternatively, through the use of a torch, swage, or crimp, for example. In a preferred embodiment, the current buses are joined to the corresponding terminations after the battery elements are placed within the battery cells. Heat is thereafter applied to terminals 24 and 26, which extend from cover 12, and to terminations 28 and 32, which do not extend through cover 12, through respective access openings (not shown). Respective access hole covers (burn caps) 199 are thereafter sealed to cover 12 to conceal respective terminations 28 and 32.

Cover 12 is united with container 14 such that frustroconical conduits 52 are disposed within compartments (cells) 38 and frustroconical conduits 54 are disposed within compartments (cells) 42. Cover 12 is then sealed to container 14 by any convenient method, for example, heat sealing or vibration welding.

Cover 12 is advantageously sealed to container 14 in the general vicinity of and about a line parallel to circumferential line 13 (see FIG. 1). In addition, the upper edge of wall 34 may be heat sealed or vibration welded to the adjoining undersurface of cover 12 (see, e.g., FIGS. 2 and 3). If desired, the upper edges of partitions 36 and 40 may be sealed to respective portions of cover 14 disposed between adjacent frustoconical conduits 52 and 54, respectively.

Upon sealing of the cover to the container and fusion of the battery elements to the terminations and terminals within the cover, the battery is ready to be filled with aqueous electrolyte. When the same chemistry is employed in the main and reserve batteries, all twelve frustoconical conduits 52, 54 may be simultaneously filled by immersing housing 10 in an aqueous electrolyte bath. If immersion is employed, the protective coating of tape covering cavity 102 (discussed above) for protecting the contents of the cavity from the acidic environment is particularly advantageous. If different chemistries are employed in the respective batteries, one set of frustoconical conduits may be temporarily sealed off while the other is left open, thereby facilitating a two stage submersion process. Alternatively, electroylte may be introduced into respective frustoconical conduits 52, 54 in any convenient manner, for example by inserting a tube into the conduits.

Upon filling the battery with electrolyte, respective vent caps 16, 18 are secured to cover 12. At this stage, the battery resembles a conventional battery, having, for example, two external terminals. Moreover, jumper 118 is disposed such that the dual battery functions as a single battery from an electrical standpoint. Accordingly, the battery may be formed in accordance with conventional formation techniques.

Formation is the process by which a battery is initially charged. Cables (not shown) are attached to terminals 24, 26 by any convenient method, for example, by twist-on connectors. The cables supply direct DC current to the battery terminals, advantageously from a rectifier used to convert a conventional AC power source to a DC current source.

Upon formation of the battery, jumper 118 is removed, thereby isolating the reserve battery from the main battery. Switching mechanism 100 is thereafter inserted into battery cavity 102, electrically and mechanically connecting respective switch contacts 64, 66 to respective bus bars 46 and 50 through the use of respective conductive screws 84 and 86. During installation of the switch, manual actuator 78 should be in the "switched off" (open) position such that the reserve battery remains isolated from the circuit comprising the main battery and terminals 24 and 26. The battery will function as a single battery, employing power delivered from the main battery only, until manual actuator 78 is switched to the closed position, thereby bringing the reserve battery into parallel with the main battery.

A primary advantage of the present invention resides in the capability of the main battery to produce in the range of about 400 to 600 cold crank amps (CCA), and particularly approximately 525 CCA's, while leaving sufficient room within a conventional battery housing envelope for an auxiliary (reserve) battery, capable of producing between 200 and 400 CCA's, and particularly approximately 275 CCA's. As is known in the industry, the above-recited CCA values are predicated upon worst case design conditions typically associated with starting an automobile at 0° F. The above recited CCA values generally correspond to a 7.2 volt baseline potential, which is the design minimum at the above-recited temperature.

The ability to dispose both batteries within a conventional housing envelope is largely a function of the relative orientation of the two batteries. The perpendicular disposition of the reserve battery relative to the main battery, in accordance with a preferred embodiment, reflects enhanced efficiency in terms of the desired voltage ratio (between the main and reserve battery) obtainable within the operating envelope.

In accordance with a further aspect of the invention, the present inventors have determined that ohmic transmission losses may be reduced by minimizing the number and length of the bus bars connecting the main and reserve battery terminations to each other, to the switching mechanism, and to the external battery terminals.

Figure 16:
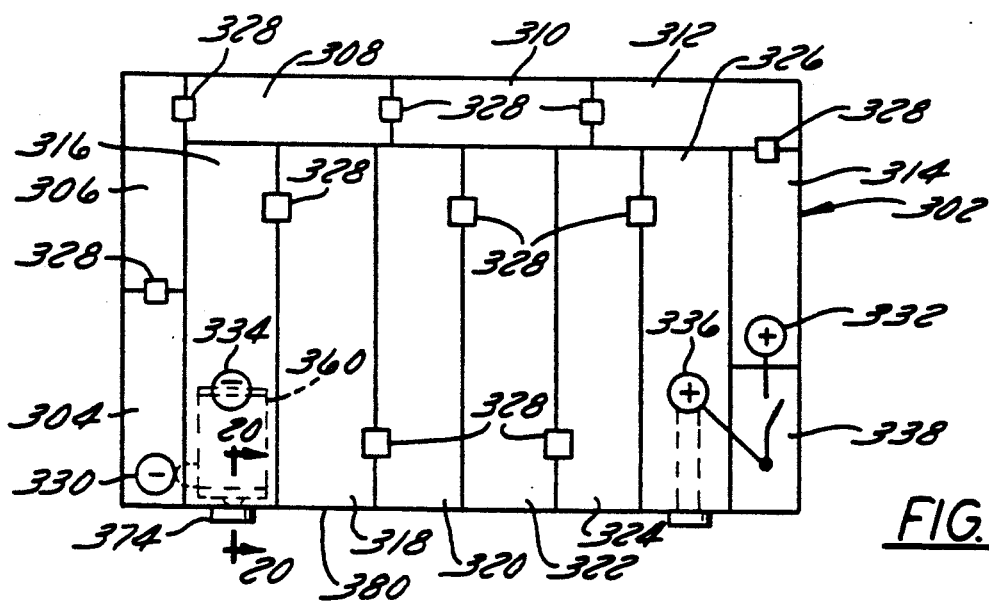
FIG. 16 is a top view schematic representation of an alternate preferred embodiment of a battery in accordance with the present invention.
Figure 17:
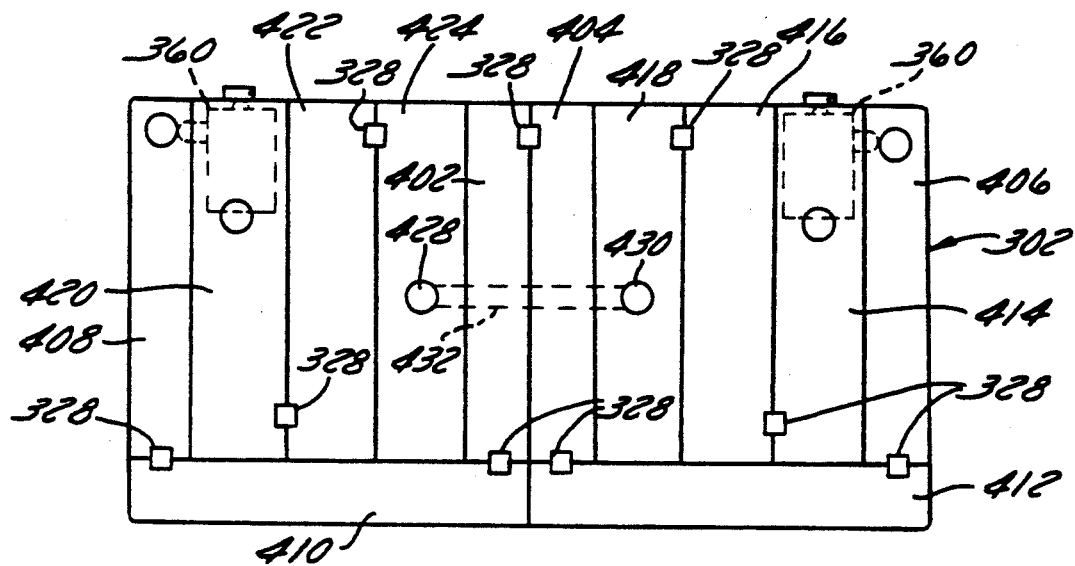
FIG. 17 is a top view schematic representation of a further alternative embodiment of a battery.

Referring now to FIGS. 16 and 17, further exemplary embodiments of a switched emergency battery according to the invention utilize a "wrap around" configuration wherein individual cells of the reserve battery are disposed about a portion of the perimeter of the battery housing.

With particular reference to FIG. 16, an exemplary dual battery 302 suitably comprises a plurality of reserve battery cells 304-314 illustratively disposed about a portion of the perimeter of battery 302. A plurality of main battery cells 316-326 are disposed in the rectangular region defined by reserve battery cells 304-314.

As previously discussed, a cell element (not shown in FIG. 16; see FIG. 3), comprising an alternating series of positive and negative electrode plates, having separators disposed therebetween, is disposed within each battery cell during manufacture. Each element further comprises a positive and a negative current bus (not shown) for attachment to an adjacent cell.

Specifically, the positive current bus of the element within reserve cell 304 is hard wired to the negative current bus of the element within reserve cell 306 at a contact 328. The positive current bus associated with reserve cell 306 is hard wired to the negative current bus associated with reserve cell 308 in a similar manner. Respective contacts 328 are suitably similar to hard wired connection 39, discussed previously in connection with FIG. 3.

Each positive and negative current bus associated with reserve cells 306-312 is hard wired to a current bus, of opposite polarity, associated with an adjacent reserve cell. Similarly, each current bus associated with main cells 318-324 is hard wired to a current bus, of opposite polarity, associated with an adjacent main cell.

As seen in FIG. 16, a single reserve cell is adjacent to each of reserve cells 304 and 314. Similarly, a single main cell is adjacent each of main cells 316 and 326. Consequently, in order to complete the electric circuit associated with each battery, a negative termination 330, associated with reserve cell 304, is connected to a negative termination 334 associated with main cell 316; a positive termination 332 associated with reserve cell 314 is connected to a positive termination 336 associated with main cell 326 through a switching mechanism (not shown in FIG. 16) analogous to that shown in FIGS. 6, 7, and 9.

An important advantage of the configuration shown in FIG. 16 involves the relative dimensions of the main and reserve cells. Specifically, if each of respective reserve cells 304-314 is approximately the same size and each of respective main cells 316-326 is approximately the same size, and the cells are arranged as shown in FIG. 16, the relative dimensions of the main and reserve cells may be selected to yield a generally rectangular cavity 338 within battery 302. Cavity 338 may be conveniently disposed proximate positive termination 336 of main cell 326 and positive termination 332 of reserve cell 314. A switching mechanism, analogous to that discussed in connection with FIGS. 6-7 and 9, may be disposed within or proximate cavity 338, thereby reducing the complexity of the cover corresponding to battery 302.

Figure 18A:
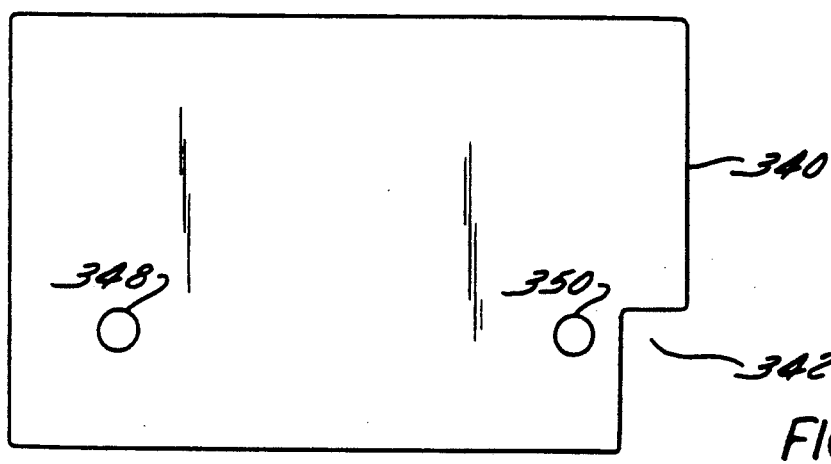
FIGS. 18A and 18B represent alternate preferred embodiments of a cover portion for use in conjunction with the battery illustrated in FIG. 16.
Figure 18B:
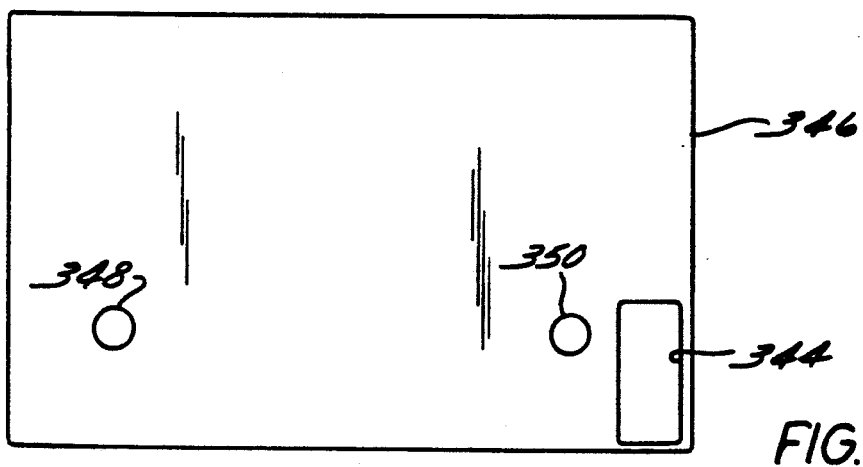

Referring now to FIGS. 16, 18A and 18B, one of respective battery covers 340, 346, which covers include respective first and second terminals 348 and 350, may be used in conjunction with battery 302. For example, cover 340 (FIG. 18A) comprises a notch 342 configured for disposition proximate cavity 338. During assembly, notch 342 may be aligned with cavity 338 and cover 340 sealed to battery 302, as discussed above in connection with FIGS. 1-15. Notch 342 provides convenient access to any components which may be disposed within cavity 338, for example, a switch mechanism, a heat or light actuator, or any suitable electrical or mechanical component. Similarly, cover 346 (FIG. 18B), comprising an access hole 344, facilitates convenient access to cavity 338 when cover 346 is joined to battery 302.

A further advantage associated with the battery configuration shown in FIGS. 16 and 18A, 18B involves the reduced complexity and expense associated with each of covers 340 and 346. In particular, the close proximity of negative reserve termination 330 and negative main termination 334 permits the use of a conductive fastener, described below, for maintaining electrical contact between the main and reserve batteries, for example at respective main and reserve terminations 330 and 334. Use of a unitary fastener eliminates the complexity and expense associated with, inter alia, bus bar 48 discussed in connection with FIGS. 1-15. Moreover, the complexity and expense associated with respective covers 340 and 346, which do not require bus-bar 48, is significantly reduced.

In addition, the close proximity of positive reserve termination 332 to positive main termination 336 permits the use of relatively short bus bars, thus reducing the cost and complexity of the bus bars connecting respective terminations 332, 336 to the switch mechanism disposed within cavity 338.

Figure 19A:
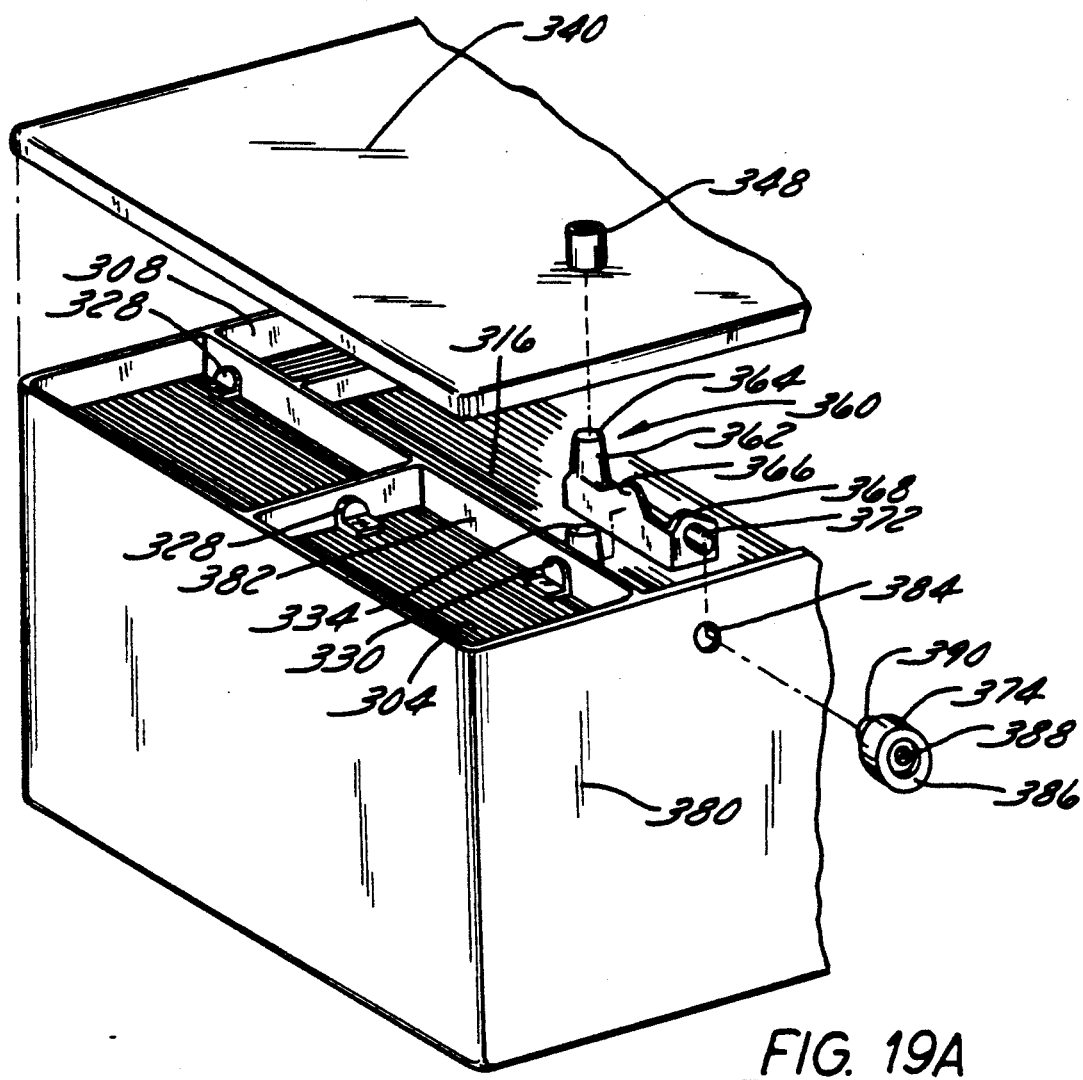
FIG. 19A is a perspective view of a portion of the battery and cover shown in FIGS. 16 and 18.
Figure 19B:
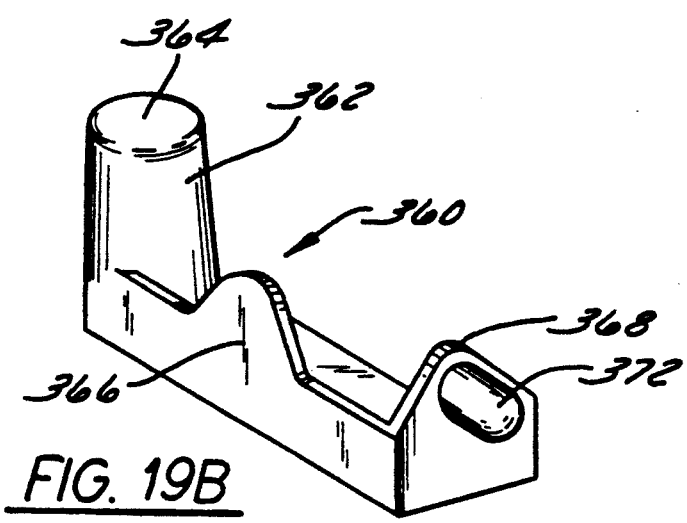
FIG. 19B is a perspective view of the fastener shown in FIG. 19A.

Referring now to FIGS. 16, 19A and 19B, a fastener (connector) 360 is configured to maintain electrical communication between the main and reserve batteries, for example by maintaining mechanical and electrical contact between negative reserve termination 330 and negative main termination 334. Moreover, fastener 360 is configured to maintain mechanical and electrical contact between both batteries and one or more external battery terminals, for example terminal 348, which extends upwardly from cover 340, or a side-mounted terminal 374 which extends through a front panel 380 of battery 302. In the preferred embodiment illustrated in FIG. 19A, fastener 360 simultaneously contacts negative reserve termination 330, negative main termination 334, top terminal 348, and side terminal 374.

Fastener 360 comprises a shank 362 having a first contact 364 for maintaining electrical communication with top terminal 348, as discussed below. Fastener 360 further includes a second contact 366, illustratively comprising a flat surface, for maintaining electrical communication with the reserve battery via negative reserve termination 330. In the preferred exemplary embodiment shown in FIG. 19A, negative reserve termination 330 is suitably similar to contact 328 discussed above in connection with FIGS. 1-15. More particularly, negative reserve termination 330 comprises a button (not shown) which extends through an opening (not shown) in partition 382 and contacts the flat surface comprising second contact 366. Alternatively, second contact 366 may comprise a button and negative reserve termination 330 may comprise a flat surface, whereby electrical communication is similarly maintained through an opening in partition 382. Fastener 360 further comprises a third contact 368 including a button 372 for maintaining electrical communication with side terminal 374.

Figure 20:
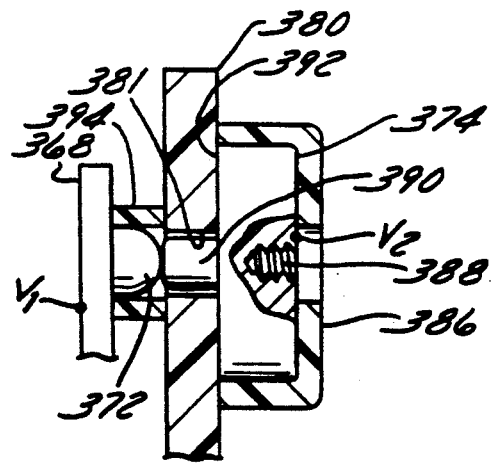
FIG. 20 is a cross-section view, taken along line 20—20 in FIG. 16, of the fastener, front panel, and terminal shown in FIG. 16.

Referring now to FIGS. 19A, 19B and 20, side terminal 374 comprises a contact pin 390, a shoulder 392, and a threaded bore 388 to facilitate threaded engagement with a vehicle battery cable (not shown). Terminal 374 is advantageously partially covered by a plastic coating 386.

Terminal 374 is advantageously molded within an opening 381 of front panel 380 of battery 302 during manufacture, such that the distal end of contact pin 390 extends through opening 381. As best viewed in FIG. 20, fastener 360 is positioned such that button 372 of third contact 368 abuts contact pin 390 of terminal 374. Terminal 374 and fastener 360 are then resistance welded together.

Resistance welding involves placing a first electrode (not shown) at point $V_1$ of third contact 368 and a second electrode at point $V_2$ of terminal 374 and inducing a current flow between respective points $V_1$ and $V_2$, as is known in the art. At high current levels, for example on the order of about two thousand amperes, portions of pin 390 and button 372 melt and fuse together. A retaining collar 394, for example a resiliently deformable plastic collar, may be disposed about button 372 to maintain mechanical integrity during fusion.

Figure 21:
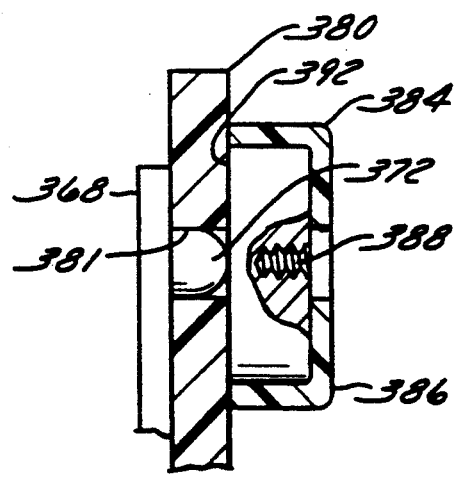
FIG. 21 is a cross-section view of an alternate preferred embodiment of the fastener, front panel and terminal shown in FIG. 20.

Referring now to FIG. 21, an alternative embodiment of the connection between the side terminal and fastener 360 comprises a modified side terminal 384 including a first surface 392, threaded bore 388, and plastic cover 386. Button 372 is guided through opening 381 in panel 380 and into contact with first surface 392. Thereafter, third contact 368 and terminal 384 may be resistance welded together. In the embodiment shown in FIG. 21, however, opening 381 retains button 372 during fusion, thus eliminating the need for collar 394.

Alternatively, the technique of extrusion fusion welding may be employed in addition to or in lieu of the button/flat configuration described above. Specifically, extrusion fusion welding may be employed to establish electrical communication between negative reserve termination 330 and second contact 366 of fastener 360 and between third contact 368 of fastener 360 and terminal 374, for example.

Extrusion fusion welding involves creating an electrical path between two conductive elements through a partition having an aperture therein, but without the use of buttons or extensions extending from one or both of the mating parts. Rather, each of the mating parts to be welded comprises a flat surface in the vicinity of the aperture through which the mating parts are to be joined. Inasmuch as the mating parts are typically made from lead or other pliable material, the parts may be clamped in the vicinity of the partition aperture, thereby deforming each part to establish mechanical contact through the aperture. Once mechanical contact is established, a voltage potential difference is maintained across the respective mating parts to induce a current through the partition aperture at the interface between the two parts, thereby fusing the parts together through the aperture. Having established a mechanical fusion between the two parts, the clamping force may be removed, leaving the two parts permanently welded together through the partition aperture.

With particular reference to FIG. 19B, second contact 366 of fastener 360 is configured to contact negative reserve termination 330 in much the same way third contact 368 contacts terminal 374. Specifically, a cell partition 382 is disposed intermediate reserve cell 304 and main cell 316. Cell partition 382 suitably includes an opening analogous to opening 381 of wall 380. To facilitate attachment of termination 330 to button 370 of fastener 360 in the manner shown in FIGS. 20 and 21, termination 330 advantageously comprises either a flat surface (not shown) analogous to first surface 392 (FIG. 21) or a pin (not shown) analogous to pin 390 (FIG. 20).

Attachment of termination 330 to fastener 360 in the foregoing manner is considerably less complex and, hence, less expensive than the use of bus bars, as described in conjunction with FIGS. 1-15.

With continued reference to FIGS. 16, 18, and 19A and 19B, negative main termination 334 is attached to the underside of shank 362 of fastener 360 in a conventional manner, for example by resistance welding.

First contact 364 of fastener 360 is configured for disposition within top terminal 348. More specifically, terminal 348 comprises a hollow, tapered projection having an internal cavity configured to receive shank 364 therein. Shank 364 is fused to terminal 348 during assembly, for example, by resistance welding.

Referring now to FIG. 17, an alternate embodiment of battery 302 comprises six reserve battery cells 402-412 and six main battery cells 414-424. More particularly, a first group of main battery cells, including cells 420, 422, and 424, is partially circumscribed by reserve battery cells 408, 410 and 402; a second group of main battery cells including cells 414, 416 and 418 is partially circumscribed by reserve battery cells 406, 404 and 412.

Main battery cell 424 includes a first main battery termination 428, and main battery cell 418 includes a second main battery termination 430. Electrical contact is maintained between respective main battery terminations 428 and 430 by a bus bar 432 extending therebetween. A plurality of contacts 328 maintain electrical communication between adjacent main battery cells and, in addition, between adjacent reserve battery cells.

A fastener 360 may be used to connect a main battery cell to a reserve battery cell and to one or more external terminals, either of the top-mounted or side-mounted variety, in a manner analogous to that discussed in connection with FIGS. 16 and 18-21. Moreover, the configuration shown in FIG. 17 may be modified to provide a switch mechanism mounted in the cover portion in a manner similar to that discussed in connection with FIGS. 1-15. In that event, a switch mechanism may be incorporated into one of fasteners 360 of FIG. 17.

It will be understood that the above description is of preferred exemplary embodiments of the present invention, and that the invention is not limited to the specific forms shown. Various other substitutions, modifications, changes, and omissions may be made in the design and arrangement of the elements without departing from the spirit of the invention as expressed in the appended claims.

We claim:

1. A dual battery system, comprising:
   a battery housing including a front panel and a top panel;
   a first battery disposed within said battery housing and including first battery elements, first means for electrically connecting said first elements in series, and a pair of first positive and negative terminations at opposite ends of said series of first elements;
   a second battery disposed within said battery housing and including second battery elements, second means for electrically connecting said second elements in series, and a pair of second positive and negative terminations at opposite ends of said series of second elements;
   a first pair of electrically conductive terminals extending from said top panel;
   a second pair of electrically conductive terminals extending from said front panel;
   first electrical connections for connecting said first and second positive terminations to one of said first pair of terminals and one of said second pair of terminals, and
   second electrical connections for connecting said first and second negative terminations to the other of said first pair of terminals and the other of said second pair of terminals.

2. The battery system of claim 1, wherein at least one of said electrical connections includes a unitary, elongated, weldable, electrically conductive connector disposed to contact:
   one of said first positive and negative terminations,
   the corresponding one of said second positive and negative terminations, respectively,
   one of said first pair of electrically conductive terminals, and
   one of said second pair of electrically conductive terminals.

3. The battery system of claim 2, wherein said connector has a shank extending upwardly from one end thereof for engagement with said terminal in said top panel, such that said connector is generally L-shaped.

4. The battery system of claim 2, wherein said battery housing further comprises a series of internal partitions dividing said housing into upwardly-opening cell compartments, each of said first and second battery elements being disposed in one of said compartments, one of said partitions has an aperture through which said connector contacts one of the terminations connected thereto, and said connector is disposed in one of said cell compartments above the battery element contained therein, and is mounted on top of the other one of the terminations connected thereto.

5. The battery system of claim 4, wherein said front panel has an aperture therethrough and said connector contacts the associated second terminal in said front panel through said aperture, and said connector has a shank extending upwardly therefrom for engagement with the associated first terminal in said top panel, such that said connector is generally L-shaped.

6. The battery system of claim 2, wherein one of said first and second electrical connections includes a switch for selectively interrupting electrical contact between the terminations associated therewith.

7. The battery system of claim 1, wherein said battery housing further comprises a series of internal partitions dividing said housing into upwardly-opening cell compartments, each of said first and second battery elements being disposed in one of said compartments, wherein said compartments are configured so that the positive termination of said first battery is in a compartment adjacent to the compartment containing the positive termination of the second battery, and the negative termination of said first battery is in a compartment adjacent to the compartment containing the negative termination of the second battery.

8. The battery system of claim 7, wherein both of said positive terminations are disposed near a first front corner of said housing, and both of said negative terminations are disposed near a second front corner of said housing at an end thereof opposite said first corner.

9. The battery system of claim 8, wherein battery elements of said first battery are disposed in a first series of compartments disposed about the periphery of said housing on three sides thereof, and battery elements of said second battery are disposed in a second series of compartments generally centrally located in said housing, said first series of compartments being arranged in surrounding relationship to said second series of compartments.

10. The battery system of claim 9, wherein each of said compartments is of rectangular shape, said housing is rectangular, and said compartments of said second series are arranged in parallel to each other and perpendicular to the lengthwise direction of said housing such that an end of each compartment in said second series adjoins said front panel of said housing.

11. A dual battery system, comprising:
a battery housing;
a first battery disposed within said battery housing and including first battery elements, first means for electrically connecting said first elements in series, and a pair of first positive and negative terminations at opposite ends of said series of first elements;
a second battery disposed within said battery housing and including second battery elements, second means for electrically connecting said second elements in series, and a pair of second positive and negative terminations at opposite ends of said series of second elements, wherein the positive termination of said first battery is disposed proximate to the positive termination of the second battery, and the negative termination of said first battery is disposed proximate to the negative termination of the second battery;
a pair of electrically conductive terminals extending from said housing;
first electrical connections for connecting said first and second positive terminations to one of said pair of terminals; and
second electrical connections for connecting said first and second negative terminations to the other of said pair of terminals, wherein at least one of said electrical connections includes a unitary, elongated, weldable, electrically conductive connector disposed to contact one of said first positive and negative terminations, the corresponding one of said second positive and negative terminations, respectively, and one of said pair of electrically conductive terminals.

12. The battery system of claim 11, wherein said connector has a shank extending upwardly from one end thereof for engagement with said terminal, such that said connector is generally L-shaped.

13. The battery system of claim 11, wherein said battery housing further comprises a series of internal partitions dividing said housing into upwardly-opening cell compartments, each of said first and second battery elements being disposed in one of said compartments, and one of said partitions has an aperture through which said connector contacts one of the terminations connected thereto.

14. The battery system of claim 13, wherein said connector is disposed in one of said cell compartments above the battery element contained therein, and is mounted on top of the other one of the terminations connected thereto.

15. The battery system of claim 11, wherein one of said first and second electrical connections includes a switch for selectively interrupting electrical contact between the terminations associated therewith.

16. The battery system of claim 11, wherein each of said positive terminations are disposed near a first front corner of said housing, and each of said negative terminations are disposed near a second front corner of said housing.

17. The battery system of claim 16, wherein battery elements of said first battery are disposed in a first series disposed about the periphery of said housing on three sides thereof, and battery elements of said second battery are disposed in a second series generally centrally located in said housing, said first series of battery elements being arranged in surrounding relationship to said second series of battery elements.

18. The battery system of claim 11, wherein said battery housing further comprises a series of internal partitions dividing said housing into upwardly-opening cell compartments, each of said first and second battery elements being disposed in one of said compartments, wherein said compartments are configured so that the positive termination of said first battery is in a compartment adjacent to the compartment containing the positive termination of the second battery, and the negative termination of said first battery is in a compartment adjacent to the compartment containing the negative termination of the second battery.

19. The battery system of claim 18, wherein both of said positive terminations are disposed near a first front corner of said housing, and both of said negative terminations are disposed near a second front corner of said housing at an end thereof opposite said first corner, and battery elements of said first battery are disposed in a first series of compartments disposed about the periphery of said housing on three sides thereof, and battery elements of said second battery are disposed in a second series compartments generally centrally located in said housing, said first series of compartments being arranged in surrounding relationship to said second series of compartments, and wherein each of said compartments is of rectangular shape, said housing is rectangular, and said compartments of said second series are arranged in parallel to each other and perpendicular to the lengthwise direction of said housing such that an end of each compartment in said second series adjoins a front panel of said housing.

20. A dual battery system, comprising:
a battery housing;
a first battery disposed within said battery housing and including first battery elements, first means for electrically connecting said first element in series, and a pair of first positive and negative terminations at opposite ends of said series of first elements;
a second battery disposed within said battery housing and including second battery elements, second means for electrically connecting said second elements in series, and a pair of second positive and negative terminations at opposite ends of said series of second elements;
a pair of electrically conductive terminals extending from said housing;
first switches electrical connections for connecting said first and second positive terminations to one of said pair of terminals; and
second switchless electrical connections for connecting said first and second negative terminations to the other of said pair of terminals.

* * * * *